US010587415B2

United States Patent
Dabbiere et al.

(10) Patent No.: US 10,587,415 B2
(45) Date of Patent: *Mar. 10, 2020

(54) SYSTEMS AND METHODS FOR CONTROLLING EMAIL ACCESS

(71) Applicant: AirWatch, LLC, Atlanta, GA (US)

(72) Inventors: Alan Dabbiere, McLean, VA (US); Erich Stuntebeck, Johns Creek, GA (US); Jonathan Blake Brannon, Mableton, GA (US)

(73) Assignee: AIRWATCH LLC, Atlanta, GA (US)

( * ) Notice: Subject to any disclaimer, the term of this patent is extended or adjusted under 35 U.S.C. 154(b) by 604 days.

This patent is subject to a terminal disclaimer.

(21) Appl. No.: 15/268,663

(22) Filed: Sep. 19, 2016

(65) Prior Publication Data

US 2017/0005802 A1    Jan. 5, 2017

Related U.S. Application Data

(63) Continuation of application No. 14/579,042, filed on Dec. 22, 2014, now Pat. No. 9,450,921, which is a
(Continued)

(51) Int. Cl.
*H04L 9/32* (2006.01)
*H04L 29/06* (2006.01)
*H04L 12/58* (2006.01)
*G06F 21/62* (2013.01)
*H04L 9/14* (2006.01)
(Continued)

(52) U.S. Cl.
CPC ........ *H04L 9/3242* (2013.01); *G06F 21/6218* (2013.01); *H04L 9/14* (2013.01);
(Continued)

(58) Field of Classification Search
CPC ....... H04L 63/08; H04L 63/102; H04L 63/10; H04L 63/107; H04W 4/02; H04W 4/023;
(Continued)

(56) References Cited

U.S. PATENT DOCUMENTS 6,006,332 A   12/1999  Rabne et al.
8,972,590 B2   3/2015  Haghpassand
(Continued)

OTHER PUBLICATIONS

Office Action dated Feb. 10, 2017 for U.S. Appl. No. 14/585,309.
(Continued)

*Primary Examiner* — Tu T Nguyen
(74) *Attorney, Agent, or Firm* — Thomas | Horstemeyer, LLP

(57) ABSTRACT

Embodiments of the disclosure relate to controlling access to email content. According to various embodiments as described herein, an email message may be accessed by a computing device to identify a uniform resource locator (URL) within the email message, wherein the URL corresponds to a resource residing in a protected location that is not accessible by a native browser application of the client device. The computing device may determine whether the client device is permitted to access the URL and request access to the resource via the secure browser application of the client device upon a determination that the client device is permitted to access the resource in accordance with the at least one resource rule.

20 Claims, 17 Drawing Sheets

Related U.S. Application Data continuation of application No. 13/723,526, filed on Dec. 21, 2012, now Pat. No. 8,826,432, which is a continuation-in-part of application No. 13/706,499, filed on Dec. 6, 2012, now Pat. No. 8,978,110.

(51) Int. Cl.
*H04W 12/04* (2009.01)
*H04W 12/06* (2009.01)

(52) U.S. Cl.
CPC .............. *H04L 51/12* (2013.01); *H04L 51/22* (2013.01); *H04L 63/0281* (2013.01); *H04L 63/04* (2013.01); *H04L 63/0428* (2013.01); *H04L 63/06* (2013.01); *H04L 63/0876* (2013.01); *H04L 63/10* (2013.01); *H04L 63/168* (2013.01); *H04W 12/04* (2013.01); *H04W 12/06* (2013.01)

(58) Field of Classification Search
CPC ... H04W 4/0231; H04W 12/08; H04W 12/06; H04W 72/08; H04W 64/00; G06F 21/6218
USPC .......................................................... 709/206
See application file for complete search history.

(56) References Cited

U.S. PATENT DOCUMENTS

| | | | |
|---|---|---|---|
| 2003/0233410 A1 | 12/2003 | Gusler et al. | |
| 2005/0060643 A1 | 3/2005 | Glass et al. | |
| 2006/0224842 A1 | 10/2006 | Suto et al. | |
| 2007/0136235 A1 | 6/2007 | Hess | |
| 2007/0156897 A1 | 7/2007 | Lim | |
| 2007/0261099 A1 | 11/2007 | Broussard et al. | |
| 2007/0294416 A1 | 12/2007 | Agre et al. | |
| 2008/0010348 A1 | 1/2008 | Dawson et al. | |
| 2009/0030884 A1 | 1/2009 | Pulfer et al. | |
| 2009/0217370 A1* | 8/2009 | Hulten .................... | G06F 21/51 726/16 |
| 2009/0248808 A1* | 10/2009 | Izumi ................... | G06Q 10/107 709/206 |
| 2010/0061356 A1 | 3/2010 | Qvarfordt et al. | |
| 2010/0125897 A1 | 5/2010 | Jain et al. | |
| 2010/0318623 A1 | 12/2010 | Bloch et al. | |
| 2011/0167492 A1 | 7/2011 | Ghosh et al. | |
| 2011/0202987 A1 | 8/2011 | Bauer-Hermann et al. | |
| 2012/0278620 A1* | 11/2012 | Singh .................... | H04L 51/063 713/168 |
| 2013/0061307 A1 | 3/2013 | Livne | |
| 2013/0097421 A1 | 4/2013 | Lim | |
| 2014/0020072 A1 | 1/2014 | Thomas | |
| 2014/0022050 A1 | 1/2014 | Dua | |

OTHER PUBLICATIONS

Office Action dated Dec. 1, 2016 for U.S. Appl. No. 13/862,218.
Office Action dated Nov. 3, 2017 for U.S. Appl. No. 15/714,032.
Notice of Allowance for U.S. Appl. No. 14/585,309 dated Aug. 25, 2017.
Office Action dated May 30, 2019 for U.S. Appl. No. 16/157,427.

* cited by examiner

SYSTEMS AND METHODS FOR CONTROLLING EMAIL ACCESS

CROSS-REFERENCE TO RELATED APPLICATIONS

This application is a continuation of, and claims priority to, U.S. patent application Ser. No. 14/579,042 entitled "SYSTEMS AND METHODS FOR CONTROLLING EMAIL ACCESS," filed on Dec. 22, 2014, which is a continuation of U.S. patent application Ser. No. 13/723,526 entitled "SYSTEMS AND METHODS FOR CONTROLLING EMAIL ACCESS," filed on Dec. 21, 2012, which is a continuation-in-part of U.S. patent application Ser. No. 13/706,499, entitled "SYSTEMS AND METHODS FOR CONTROLLING EMAIL ACCESS," filed on Dec. 6, 2012. The patent applications identified above are incorporated herein by reference in their entireties.

FIELD OF THE INVENTION

Embodiments of the disclosure relate generally to data security, and more particularly, to systems and methods for controlling email access.

BACKGROUND

Controlling email access is critical to ensure that email resources may only be accessed by authorized parties in authorized manners. To date, enterprises have utilized access credentials to control which, if any, parties may access email resources. This method may ensure that only authorized parties may access email resources. However, this method fails to control how those email resources may be accessed by the proper recipients. This method further fails to modify the email resources to comply with enterprise security standards. As enterprises seek to protect sensitive information, systems and methods for controlling email access are necessary to ensure that email resources may only be accessed by authorized parties in authorized manners.

BRIEF SUMMARY

Some or all of the above needs and/or problems may be addressed by certain embodiments of the disclosure. Certain embodiments may include systems and methods for controlling access to networks. According to one embodiment of the disclosure, a system is disclosed. The system can include at least one client device. The system can also include at least one email service. The system can further include at least one memory that stores computer-executable instructions. The system can further include at least one processor configured to access at least one memory. The processor is configured to execute the computer-executable instructions to perform a method including the steps of proxying at least one email resource in transit to the client device from the email service, removing at least one uniform resource locator (URL) from the email resource, and adding at least one modified URL to the email resource.

According to another embodiment of the disclosure, a method is disclosed. The method can include identifying at least one email resource on at least one client device, identifying at least one URL within the email resource, removing the URL from the email resource, and adding at least one modified URL to the email resource.

Further, according to another embodiment of the disclosure, a non-transitory computer-readable medium embodying a program executable in a computing device is disclosed, the program comprising code that, when executed by a computing device, causes the computing device to perform a method comprising the steps of identifying at least one URL within at least one email resource, removing the URL from the email resource, and adding at least one modified URL to the email resource.

Other embodiments, systems, methods, apparatus aspects, and features of the disclosure will become apparent to those skilled in the art from the following detailed description, the accompanying drawings, and the appended claims.

BRIEF DESCRIPTION OF THE DRAWINGS

The detailed description is set forth with reference to the accompanying drawings, which are not necessarily drawn to scale. The use of the same reference numbers in different figures indicates similar or identical items.

DETAILED DESCRIPTION

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the disclosure are directed to, among other things, controlling access to email. As an overview, access to email may be controlled by limiting access of proper recipients to specific email resources and by limiting the manner in which the proper recipients access the specific email resources. In certain embodiments, the email resources may be modified to satisfy access restrictions.

The technical effects of certain embodiments of the disclosure may include preventing unauthorized access to email resources and eliminating costs associated with sensitive information loss. Moreover, the technical effects of certain embodiments of the invention may include modifying email resources to satisfy access restrictions.

Figure 1:
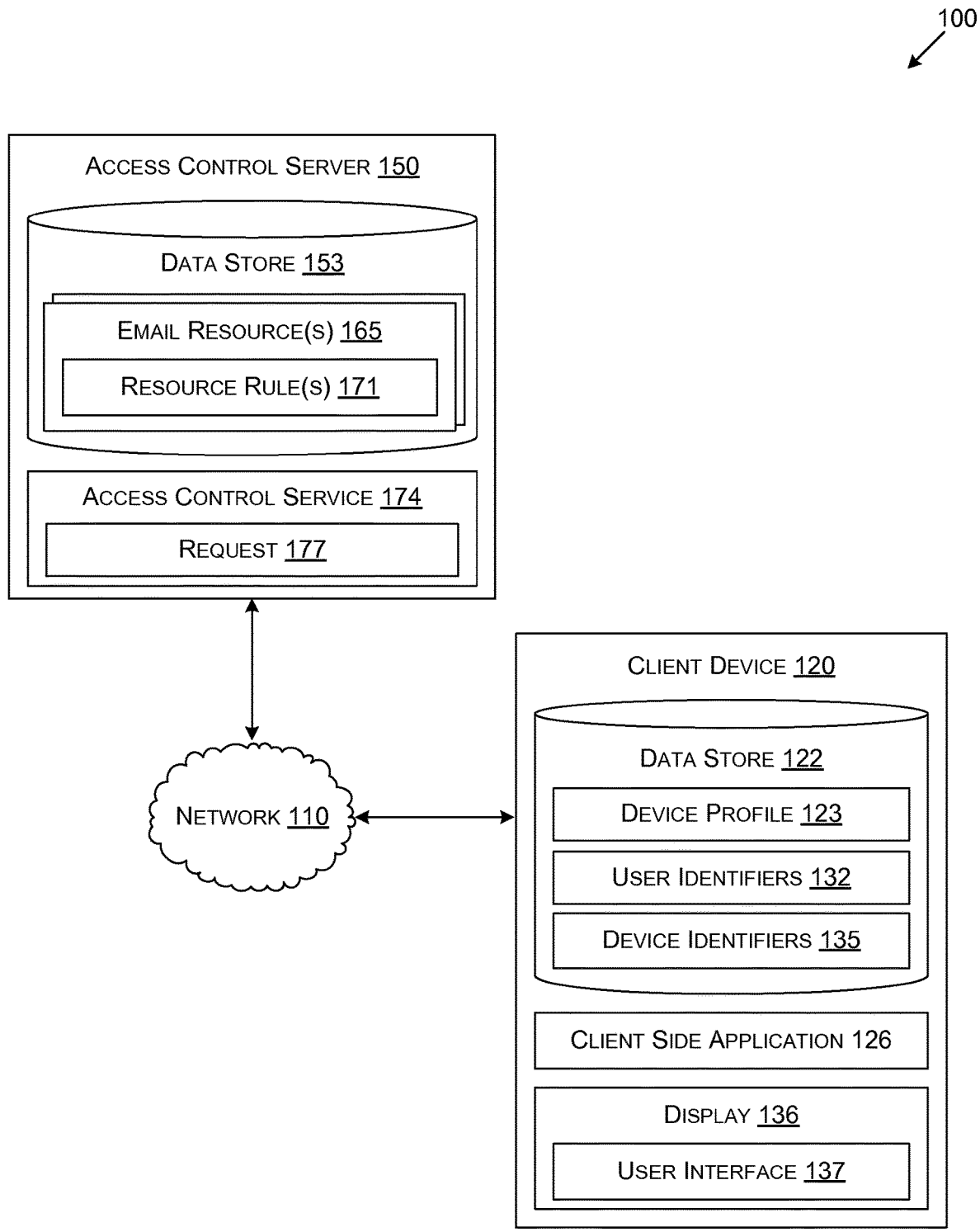
FIG. 1 illustrates a block diagram of a networked environment according to certain embodiments of the disclosure.

FIG. 1 depicts certain illustrative components for a networked environment 100 according to various embodiments. In certain embodiments, the networked environment 100 may include a network 110, a client device 120, and an access control server 150. In some embodiments, the network 110 may be or include, for example, any type of wireless network such as a wireless local area network (WLAN), a wireless wide area network (WWAN), and/or the like. Additionally, the network 110 may be or include the Internet, intranets, extranets, microwave networks, satellite communications, cellular systems, PCS, infrared communications, global area networks, and/or any combination of two or more such networks. In one embodiment, the network 110 facilitates access to email resources 165 for at least one client device 120, where access to the email resources 165 is controlled by an access control server 150.

The client device 120 may comprise, for example, a cellular telephone, a smartphone and/or personal digital assistant, a tablet computer and/or web pad, a laptop computer, a desktop computer, a set-top box, a music player, a game console, and/or another device with like capability. For purposes of convenience, the client device 120 is referred to herein in the singular. Even though the client device 120 is referred to in the singular, it is understood that more than one client device 120 may be employed in the arrangements as described herein.

The client device 120 may include a wired network connectivity component (not shown in FIG. 1), for example, an Ethernet network adapter, a modem, and/or the like. The client device 120 may further include a wireless network connectivity interface (not shown in FIG. 1), for example, a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like. The client device 120 may be operable to communicate via wired connection with the access control server 150 with the aid of the wired network connectivity component. The client device 120 may be further operable to communicate wirelessly with the access control server 150 with the aid of the wireless network connectivity component.

The client device 120 may comprise a memory for storing data and applications, a processor for executing applications stored in memory, a display 136 upon which the processor may execute at least one user interface 137, and a local interface such as a bus, as will be described with respect to FIG. 12. The memory of the client device 120 may comprise a data store 122. The data store 122 of the client device 120 may include a device profile 123. In one embodiment, the device profile 123 may represent hardware, software, and security attributes that describe the state of the client device 120. For instance, the device profile 123 may represent hardware specifications of the client device 120, version and configuration information of various software programs and hardware components installed on the client device 120, transport protocols enabled on the client device 120, version and usage information of various other resources stored on the client device 120, and/or any other attributes associated with the state of the client device 120. In another embodiment, the device profile 123 may further include characteristics describing the state of the client device 120, including indications of the location of the client device 120, the current time associated with the client device 120, a detection of at least one network beacon associated with at least one network 110 by the client device 120, and the signal strength of the network beacons received by the client device 120. In yet another embodiment, the device profile 123 may include data indicating a date of a last virus scan of the client device 120, a date of a last access and/or service by an Information Technology (IT) representative, a date of a last access by an access control service 174, and/or any other data indicating a date of last maintenance of the client device 120.

Additionally, the data store 122 of the client device 120 may include at least one user identifier 132. The user identifiers 132 may uniquely identify the user of the client device 120. In one embodiment, the user identifiers 132 may include a username, a password, and/or biometric data related to facial recognition, retina recognition, fingerprint recognition, and the like. Similarly, the data store 122 of the client device 120 may include at least one device identifier 135. The device identifiers 132 may uniquely identify the client device 120. In one embodiment, the device identifiers 135 may be a unique hardware identifier such as a GUID (Globally Unique Identifier), UUID (Universally Unique Identifier), UDID (Unique Device Identifier), serial number, IMEI (International Mobile Equipment Identity), Wi-Fi MAC (Media Access Control) address, Bluetooth MAC address, a CPU ID, and/or the like, or any combination of two or more such hardware identifiers. In another embodiment, the device identifier 135 may be a unique software identifier such as a token or certificate, based at least in part on the aforementioned unique hardware identifiers.

The client device 120 may be configured to execute various applications. For example, the client device 120 may be configured to execute applications such as secure container applications, web browsing applications, email applications, instant messaging applications, word processing applications and/or other applications capable of receiving and/or rendering email resources 165 on a display 136 associated with the client device 120. Any application capable of receiving and/or rendering email resources 165 on a display 136 of the client device 120 is generally referred to herein as a "client side application" 126. The client side application 126 may be stored in the memory of the client device 120. In one embodiment, the client side application 126 may be a secure container application that may be authorized to receive and render email resources 165 in accordance with at least one resource rule 171, as described herein. The client side application 126 may include a cryptographic key to decrypt email resources 165 encrypted with a cryptographic key in order to prevent unauthorized access to the email resources 165. For instance, the client side application 126 may have a cryptographic key that may be capable of decrypting email resources 165 transmitted in an encrypted format to the client device 120 by an access control service 174 executed by an access control server 150.

The client side application 126 may be executed to transmit at least one request 177 to access at least one email resource 165. In certain embodiments, the client side application 126 may transmit requests 177 to an access control service 174. In some embodiments, the requests 177 may include a listing of specific email resources 165 that the client device 120 seeks to access. In other embodiments, the requests 177 may include an indication that the client device 120 seeks access to email resources 165 associated with the client device 120, such as email resources 165 addressed to the user of the client device 120. In any instance, the requests 177 may include data from the data store 122 of the client device 120 that may assist an access control service 174 in determining whether the client device 120 is authorized to access the email resources 165. In one embodiment, the request 177 may include the device profile 123 associated with the client device 120. In another embodiment, the request 177 may include user identifiers 132 associated with the client device 120. In yet another embodiment, the request 177 may include device identifiers 135 associated with the client device 120.

The client side application 126 may be further executed to receive an indication that the client device 120 is authorized to access the email resources 165. In certain embodiments, the client side application 126 may receive an authorization indication from an access control service 174 executed by an access control server 150. In some embodiments, the authorization indication may specify which, if any, email resources 165 that the client device 120 is authorized to access and may specify the manner in which the client device 120 may access such email resources 165. In one embodiment, the authorization indication may specify that the client device 120 is authorized to access the email resources 165 while the client device 120 is located within at least one authorized location. In another embodiment, the authorization indication may specify that the client device 120 is authorized to access the email resources 165 while the current time associated with the client device 120 is within at least one authorized window. In yet another embodiment, the authorization indication may specify that the client device 120 is authorized to access the email resources 165 while the client device 120 is communicatively connected to at least one network 110 and/or at least one network beacon associated with the network 110, as described in application Ser. No. 13/656,046 entitled "SYSTEMS AND METHODS FOR CONTROLLING NETWORK ACCESS," which is incorporated herein by reference in the entirety.

The client side application 126 may be further executed to receive at least one email resource 165. In certain embodiments, the client side application 126 may receive email resources 165 from an access control service 174 executed by an access control server 150. In some embodiments, the client side application 126 may receive email resources 165 from an enterprise email service, such as Microsoft Exchange, Lotus Notes, Novell Groupwise, Zimbra, or the like. In other embodiments, the client side application 126 may receive email resources 165 from a distribution service executed by a distribution server, as described in application Ser. Nos. 13/396,356 and 13/623,627 both entitled "CONTROLLING DISTRIBUTION OF RESOURCES ON A NETWORK," which are incorporated herein by reference in their entirety.

In any instance, the email resources 165 may include various types of electronic data, such as email messages and email attachments. In certain embodiments, the email messages may include text and/or formatting in email headers, email sender fields, email recipient fields, email subject fields, email bodies, email signatures, and/or email footers. Additionally, the email attachments may include settings-type attachments, applications-type attachments, and content-type attachments. In one embodiment, settings-type attachments may include hardware settings, software settings, and/or the like that configure the functionality provided by the client device 120. In another embodiment, application-type attachments may include book applications, business applications, catalogue applications, education applications, entertainment applications, finance applications, food and drink applications, games applications, health and fitness applications, lifestyle applications, medical applications, music applications, navigation applications, news applications, newsstand applications, photo and video applications, productivity applications, reference applications, social networking applications, sports applications, travel applications, utility applications, weather applications, and/or the like. In yet another embodiment, content-type attachments may include application content, video content, image content, audio content, text content, word processor content, presentation content, spreadsheet content, database content, compressed folder content, disk image content, encrypted content, backup content, web content, page layout content, plug-in content, font content, system content, developer content, data content and/or the like.

The client side application 126 may be similarly executed to receive at least one resource rule 171 associated with the email resources 165. In certain embodiments, the resource rules 171 may regulate use of and/or access to the email resources 165. In some embodiments, the resource rules 171 may include format rules, content rules, attachment rules, and/or access rules. In one embodiment, the format-type resource rules 171 may specify at least one of required, permitted, and/or prohibited formats of the email resources 165. For example, a format-type resource rule 171 may specify that all email resources 165 must be encrypted with AES-256 bit encryption. In another embodiment, the content-type resource rules 171 may specify at least one of required, permitted, and/or prohibited content of the email resources 165. For instance, a content-type resource rule 171 may specify that any email resources 165 containing the text "confidential" must be transmitted utilizing a secure transmission protocol, such as the HTTPS/SSL transmission protocol. In yet another embodiment, the attachment-type resource rules 171 may specify at least one of required, permitted, and/or prohibited attachments to the email resources 165. For example, an attachment-type resource rule 171 may specify that attachments to the email resources 165 must be stripped from the email resources 165. In a further embodiment, the access-type resource rules 171 may specify at least one of required, permitted, and/or prohibited access to the email resources 165. For instance, an access-type resource rule 171 may specify that the email resources 165 must be configured to be exclusively accessible via a secure container application, such as the client side application 126. Furthermore, the various types of resource rules 171 may be combined to establish granular access rights. For example, a combination of resource rules 171 may specify required attachment format, attachment content, and attachment access.

In some embodiments, the resource rules 171 may be metadata and/or other indications that describe the email resources 165. In particular, the resources rules 171 may specify categories/sub-categories to which the email resources 165 belong, that the email resources 165 are considered favorites, the ownership of the email resources 165, the managing party of the email resources 165, that the email resources 165 are confidential, that the email resources 165 are password protected, the historical version of the email resources 165, at least one description of the email resources 165, at least one comment regarding the email resources 165, the size and format of the email resources 165, the download priority associated with the email resources 165, an expiration date associated with the email resources 165, at least one effective date associated with the email resources 165, and/or the like.

In other embodiments, the resource rules 171 associated with the email resources 165 may change based on the state of the client device 120. In certain embodiments, the stringency of the resource rules 171 may be increased, reduced, and/or eliminated based on the state of the client device 120. In one embodiment, the stringency of the resource rules 171 may be increased, reduced, and/or eliminated if the client device 120 is located within the transmission range of certain network beacons and/or certain networks 110 associated with such network beacons. In another embodiment, the stringency of the resource rules 171 may be increased, reduced, and/or eliminated if the client device 120 is located within at least one location. In yet another embodiment, the stringency of the resource rules 171 may be increased, reduced, and/or eliminated if the current time associated with the client device 120 is within at least one time window. In a further embodiment, the stringency of the resource rules 171 may be increased, reduced, and/or eliminated if the client device 120 has previously satisfied the resource rules 171.

Additionally, the client side application 126 may be executed to determine whether the client device 120 is authorized to access the email resources 165. In certain embodiments, the client side application 126 may determine whether the resource rules 171 associated with the email resources 165 are satisfied by the email resources 165. For instance, the client side application 126 may determine that the client device 120 is authorized to access the email resources 165 if the attachments to the email resources 165 have been stripped from the email resources 165 in accordance with the resource rules 171 associated with the email resources 165, which specify that the email resources 165 may not have attachments. In some embodiments, the client side application 126 may determine whether the client device is authorized based at least in part on device profiles 123, user identifiers 132, or device identifiers 135.

The client side application 126 may be further executed to modify the email resources 165. In certain embodiments, the client side application 126 may modify the email resources 165 in response to a determination that the email resources 165 do not satisfy the resource rules 171 associated with the email resources 165. In particular, the client side application 126 may modify the email resources 165 so that the email resources 165 satisfy the resource rules 171 associated with the email resources 165. In some embodiments, the client side application 126 may modify at least one portion of the email resources 165. In other embodiments, the client side application 126 may modify all portions of and/or the entirety of the email resources 165.

In any instance, the client side application 126 may modify the email resources 165 by formatting, encoding, configuring, adding, removing, stripping, moving, replacing and/or flagging portions of the email resources. In one embodiment, the client side application 126 may modify the email resources 165 by formatting the email resources 165 into HyperText Markup Language (HTML), Rich Text, Plain Text, and/or other formats. In another embodiment, the client side application 126 may modify the email resources 165 by encoding the email resources 165 using Advanced Encryption Standard (AES), Data Encryption Standard (DES), and/or other encryption protocols. In yet another embodiment, the client side application 126 may modify the email resources 165 by configuring the email resources 165 to be exclusively accessible via at least one secure container application, such as the client side application 126. In a further embodiment, the client side application 126 may modify the email resources 165 by adding portions to and/or removing portions from the email resources 165, for instance, by adding or removing an email signature.

Additionally, in an exemplary embodiment, the client side application 126 may modify the email resources 165 by removing portions of the email resources 165 and configuring the removed portions of the email resources 165 to be exclusively accessible via a secure container application, such as the client side application 126. For example, the client side application 126 may remove attachments from the email resources 165 and may encrypt the removed attachments based at least in part on at least one cryptographic key accessible to the client side application 126. In another embodiment, the client side application 126 may modify the email resources 165 by performing at least one of decrypting the email resources 165, re-encrypting the email resources 165, cryptographically signing email resources 165, or re-signing email resources 165. In yet another embodiment, the client side application 126 may modify the email resources 165 by moving certain portions of the email resources 165, such as by moving a photograph from the body of the email resources 165 to the attachments of the email resources 165. In a further embodiment, the client side application 126 may modify the email resources 165 by replacing certain portions of the email resources 165, such as replacing misspelled text with the properly spelled text. In a further embodiment, the client side application 126 may modify the email resources 165 by flagging the email resources 165 as having been modified, such as by attaching an indication to the email resources 165 that provides information related to the modification of the email resources 165.

The client side application 126 may be further executed to access at least one email resource 165. In certain embodiments, the client side application 126 may access the email resources 165 received from an access control service 174 and/or another distribution service. In some embodiments, the client side application 126 may access the email resources 165 on the client device 120 in accordance with the resource rules 171. For example, the client side application 126 may determine that the email resources 165 may not be accessed by the client device 120 because the client device 120 is not located within an authorized location specified by the resource rules 171 associated with the email resources 165.

In any instance, the client side application 126 may access the email resources 165 on the client device 120 by storing, installing, activating, rendering and/or executing the email resources 165 on the client device 120. In one embodiment, the client side application 126 may store the email resources 165 on the client device 120 by placing the email resources 165 in the data store 122 of the client device 120. In another embodiment, the client side application 126 may install the email resources 165 on the client device 120 by placing the email resources 165 in the data store 122 of the client device 120 and by disabling and/or removing any files that conflict with the email resources 165. In yet another embodiment, the client side application 126 may activate the email resources 165 on the client device 120 by placing the email resources 165 in the data store 122 of the client device 120, by disabling and/or removing any files that conflict with the email resources 165, and by instructing the client device 120 to conform its operations to the email resources 165. Additionally, the client side application 126 may call on other applications and/or services accessible to the client device 120 that are associated with the email resources 165.

In a further embodiment, the client side application 126 may render the email resources 165 on the client device 120 by presenting the email resources 165 in a user interface 137 executed on the display 136 of the client device 120. In particular, the client side application 126 may render the email resources 165 in a user interface 137 by decompressing compressed files and presenting the uncompressed files; mounting disk image files and presenting the mounted image files; running executable files and presenting the executed files; enabling a data search of the email resources 165 and presenting the featured output in a user interface 137; calling on another application on the client device 120 to respond to data links contained within the email resources 165; and/or transmitting a part or the whole of the email resources 165 to another application on the client device 120. The client side application 126 may render a single email resource 165 or a series of email resources 165 in a comprehensive manner, such as presenting image files in a slideshow-style presentation, and may further render an environment that displays an array of email resources 165 in a single view, such as a category-based tree or outline format. Additionally, in an exemplary embodiment, the client side application 126 may execute the email resources 165 by placing the email resources 165 in the data store 122 of the client device 120, by disabling and/or removing any files that conflict with the email resources 165, and by instructing the client device 120 to perform the operations of the email resources 165.

In certain embodiments, the client side application 126 may be a secure container application that is configured to protect the email resources 165 from unauthorized access. In some embodiments, the client side application 126 may be configured to protect email resources 165 that have been received from an access control service 174. In one embodiment, the client side application 126 may be executed to enforce the resource rules 171 and/or other metadata associated with the email resources 165. For instance, the client side application 126 may prohibit cutting, copying, pasting, transmitting, emailing, text messaging, screen capturing, and/or otherwise manipulating the email resources 165 while the email resources 165 are accessed by the client side application 126. In another embodiment, the client side application 126 may prohibit other applications on the client device 120 and/or other services accessible to the client device 120 from accessing the email resources 165. In particular, the client side application 126 may monitor the data stream between the network 110 and the client device 120, may block any access attempts by another application and/or service, may proxy the email resources 165, and may present the proxied email resources 165 in a user interface 137 rendered by the client side application 126.

The access control server 150 may comprise, for example, a server computer or any other system providing access control capability. Alternatively, a plurality of access control servers 150 may be employed that are arranged, for example, in at least one server bank, computer bank or other arrangement. For example, a plurality of access control servers 150 together may comprise a cloud computing resource, a grid computing resource, and/or any other distributed computing arrangement. Such access control servers 150 may be located in a single installation or may be distributed among many different geographic locations. For purposes of convenience, the access control server 150 is referred to herein in the singular. Even though the access control server 150 is referred to in the singular, it is understood that a plurality of access control servers 150 may be employed in the arrangements as described herein.

The access control server 150 may comprise a memory for storing data and applications and a processor for executing applications stored in memory, as will be described with respect to FIG. 17. The memory of the access control server 150 may comprise a data store 153. The data store 153 may be representative of at least one data store. The data store 153 may contain certain data that is accessible to the access control server 150. In particular, the data store 153 may contain at least one email resource 165 and at least one resource rule 171 associated with the email resources 165, as described herein. The data in the data store 153 may be associated with the operation of certain applications and/or functionalities executed by the access control server 150. The data store 153 may utilize strong encryption standards to protect the email resources 165 from unauthorized access. For example, the data store 153 may utilize AES (Advanced Encryption Standard) or a similar strong encryption standard commonly utilized for server-side data storage.

The access control server 150 may execute certain applications and/or functionalities such as the access control service 174, as well as other applications, services, processes, systems, engines, or functionality not disclosed in detail herein. The access control service 174 may be executed to control email access. In particular, the access control service 174 may limit access to at least one email resource 165 to at least one client device 120 that is authorized to access the email resources 165. The access control service 174 may be further executed to modify at least one email resource 165 so that the email resources 165 satisfy at least one resource rule 171 associated with the email resources 165. The access control service 174 may be further executed to distribute at least one email resource 165 to at least one client device 120 that is authorized to access the email resources 165.

The access control service 174 may be executed to control access to at least one email resource 165. In certain embodiments, the access control service 174 may be executed to determine whether at least one client device 120 is authorized to access the email resources 165. In some embodiments, the client side application 126 may determine whether the resource rules 171 associated with the email resources 165 are satisfied by the email resources 165. For instance, the access control service 174 may determine that a client device 120 is authorized to access the email resources 165 if the attachments to the email resources 165 have been stripped from the email resources 165 in accordance with the resource rules 171, which specify that the email resources 165 may not have attachments. In other embodiments, the access control service 174 may determine whether the client device is authorized based at least in part on at least one of the device profiles 123, user identifiers 132, or device identifiers 135.

The access control service 174 may be further executed to modify the email resources 165 to satisfy the resource rules 171 associated with the email resources 165. In certain embodiments, the access control service 174 may modify the email resources 165 in response to a determination that the email resources 165 do not satisfy the resource rules 171 associated with the email resources 165. In particular, the access control service 174 may modify the email resources 165 so that the email resources 165 satisfy the resource rules 171 associated with the email resources 165. In some embodiments, the access control service 174 may modify at least one portion of the email resources 165. In other embodiments, the access control service 174 may modify all portions of and/or the entirety of the email resources 165.

In any instance, the access control service 174 may modify the email resources 165 by formatting, encoding, configuring, adding, removing, stripping, moving, replacing, or flagging portions of the email resources 165. In one embodiment, the access control service 174 may modify the email resources 165 by formatting the email resources 165 into HyperText Markup Language (HTML), Rich Text, Plain Text, and/or other formats. In another embodiment, the access control service 174 may modify the email resources 165 by encoding the email resources 165 using Advanced Encryption Standard (AES), Data Encryption Standard (DES), and/or other encryption protocols. In yet another embodiment, the access control service 174 may modify the email resources 165 by configuring the email resources 165 to be exclusively accessible via at least one secure container application, such as a client side application 126. In a further embodiment, the access control service 174 may modify the email resources 165 by adding portions to and/or removing portions from the email resources 165, for instance, by adding or removing an email signature.

Additionally, in an exemplary embodiment, the access control service 174 may modify the email resources 165 by removing portions from the email resources 165 and configuring the removed portions of the email resources 165 to be exclusively accessible via a secure container application, such as the client side application 126. For example, the access control service 174 may remove attachments to the email resources 165 from the email resources 165, may encrypt the removed attachments based at least in part on at least one cryptographic key, and may make the removed attachments and cryptographic keys accessible to the client side application 126. In another embodiment, the access control service 174 may modify the email resources 165 by performing at least one of decrypting the email resources 165, re-encrypting the email resources 165, cryptographically signing email resources 165, or re-signing email resources 165. In yet another embodiment, the access control service 174 may modify the email resources 165 by moving certain portions of the email resources 165, such as by moving a photograph from the body of the email resources 165 to the attachments of the email resources 165. In a further embodiment, the access control service 174 may modify the email resources 165 by replacing certain portions of the email resources 165, such as replacing misspelled text with the properly spelled text. In a further embodiment, the access control service 174 may modify the email resources 165 by flagging the email resources 165 as having been modified, such as attaching an indication to the email resources 165 that provides information related to the modification of the email resources 165.

The access control service 174 may be further executed to transmit at least one email resource 165 to at least one client device 120. In certain embodiments, the access control service 174 may transmit the email resources 165 to the client devices 120 responsive to a determination that the client devices 120 are authorized to access the email resources 165. In some embodiments, the access control service 174 may transmit the email resources 165 to the client devices 120 responsive to modifying the email resources 165 to satisfy the resource rules 171 associated with the email resources 165. In one embodiment, the access control service 174 may directly transmit the email resources 165 to a client side application 126 executed by the client devices 120. In another embodiment, the access control service 174 may make the email resources 165 available for download by the client devices 120 and may transmit the email resources 165 to the client devices 120 upon receiving requests 177 to download the email resources 165 from the client devices 120. In any instance, the access control service 174 may establish a communicative connection with the client devices 120 by utilizing a secure transmission protocol, such as HTTPS/SSL, before transmitting the email resources 165 to the client devices 120.

Figure 2:
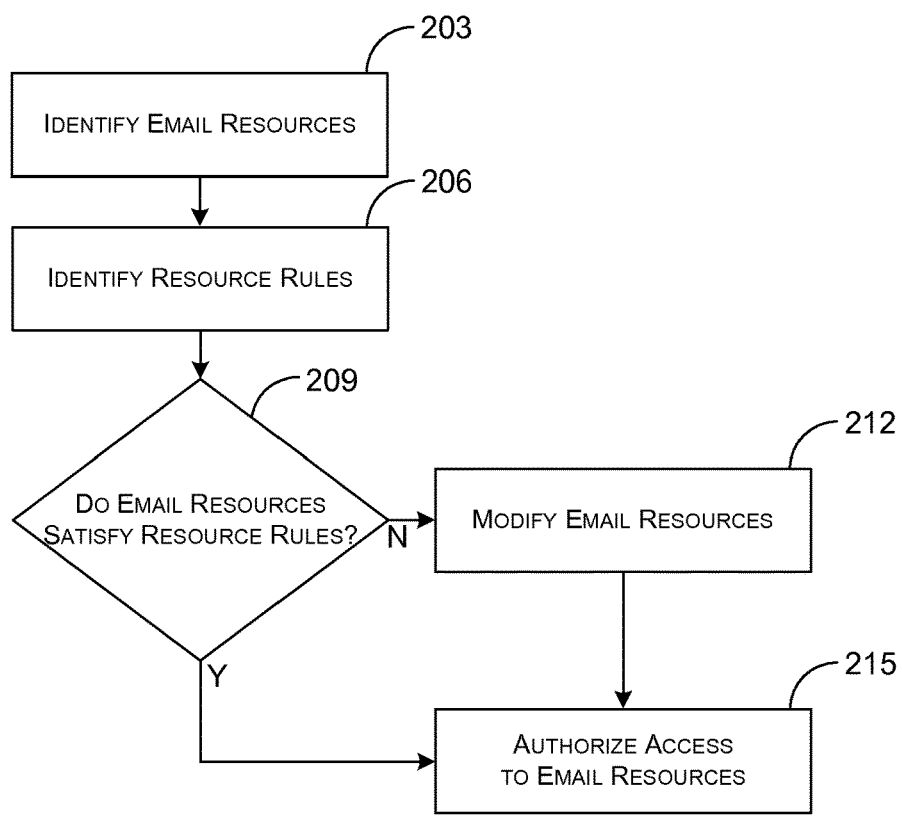
FIG. 2 illustrates a flow diagram of exemplary functionality performed by an access control service executed by an access control server in the networked environment of FIG. 1 according to certain embodiments of the present disclosure.

FIG. 2 is a flowchart illustrating exemplary functionality performed by an access control service 174 executed by an access control server 150 (FIG. 1) according to certain embodiments. It is understood that the flowchart of FIG. 2 provides merely an example of the many different types of functional arrangements that may be employed to implement the operation of the access control service 174 as described herein. As an alternative, the flowchart of FIG. 2 may be viewed as depicting an example of steps of a method implemented in the access control server 150 according to at least one embodiment.

Beginning with step 203, the access control service 174 may identify at least one email resource 165 (FIG. 1). In certain embodiments, the access control service 174 may identify at least one email resource 165 associated with at least one client device 120 (FIG. 2). In one embodiment, the email resources 165 may be associated with the client devices 120 if the email resources 165 are addressed to the client devices 120 and/or the users of the client devices 120. For instance, the email resources 165 may be addressed to the client devices 120 and/or the users of the client devices 120 if the identities of the client devices 120 and/or the users of the client devices 120 are specified within the email headers, email sender fields, email CC fields, email BCC fields, email recipient fields, email subject fields, email bodies, email signatures, and/or email footers of the email resources 165. In another embodiment, the email resources 165 may be associated with the client devices 120 if the email resources 165 are accessible to the client devices 120, for instance, via at least one user identifier 132, at least one device identifier 135, and/or at least one device profile 123 associated with the client devices 120. In yet another embodiment, the email resources 165 may be associated with the client devices 120 according to a listing of associated email resources 165 and client devices 120. In any instance, the email resources 165 may include email messages, email attachments, and/or other electronic data, as described herein.

Next, in step 206, the access control service 174 may identify at least one resource rule 171 (FIG. 2). In certain embodiments, the access control service 174 may identify at least one resource rule 171 associated with at least one email resource 165. In some embodiments, a given resource rule 171 may be associated with at least one email resource 165 and, similarly, a given email resource 165 may be associated with at least one resource rule 171. In one embodiment, the resource rules 171 may be associated with the email resources 165 if the resource rules 171 are embedded within the email headers, email bodies, email signatures, and/or email footers of the email resources 165. In particular, the email resources 165 may include embedded metadata and/or other instructions that represent at least one resource rule

171. In another embodiment, the resource rules 171 may be associated with the email resources 165 if the resource rules 171 are affixed to the email resources 165, such as attachments to the email resources 165. In yet another embodiment, the resource rules 171 may be associated with the email resources 165 according to a listing of associated email resources 165 and resource rules 171. In any instance, the resource rules 171 may regulate access to the email resources 165 associated with the resource rules 171 by the client devices 120 associated with the email resources 165, as described herein.

Then, in step 209, the access control service 174 may determine whether the email resources 165 satisfy the resource rules 171 associated with the email resources 165. In certain embodiments, the access control service 174 may determine that the client devices 120 associated with the email resources 165 are authorized to access the email resources 165 if the email resources 165 satisfy the associated resources rules 171. In any instance, the access control service 174 may determine whether the state of the email resources 165 satisfies the requirements specified by the associated resource rules 171. In particular, the access control service 174 may determine whether the email headers, email sender fields, email CC fields, email BCC fields, email recipient fields, email subject fields, email bodies, email signatures, email footers, and/or email attachments of the email resources 165 satisfy the associated resource rules 171, as described herein.

If the access control service 174 determines that the email resources 165 do not satisfy the resource rules 171, then the access control service 174 may proceed to step 212 and may modify the email resources 165. In certain embodiments, the access control service 174 may modify the email resources 165 so that the email resources 165 satisfy the resource rules 171 associated with the email resources 165. In some embodiments, the access control service 174 may modify at least one portion of the email resources 165. In other embodiments, the access control service 174 may modify all portions of and/or the entirety of the email resources 165. In any instance, the access control service 174 may modify the email resources 165 by formatting, encoding, configuring, adding, removing, stripping, moving, replacing and/or flagging portions of the email resources 165, as described herein.

On the contrary, if the access control service 174 determines that the email resources 165 satisfy the resource rules 171, then the access control service 174 may proceed to step 215 and may authorize the client devices 120 to access the email resources 165. In certain embodiments, the access control service 174 may authorize the client devices 120 to access the email resources 165 by transmitting the email resources 165 to at least one client side application 126 (FIG. 2) executed by the client devices 120. In some embodiments, the access control service 174 may authorize the client devices 120 to access the email resources 165 by notifying the client devices 120 that the email resources 165 may be downloaded from the access control service 174 and may further transmit the email resources 165 to the client devices 120 upon a request 177 (FIG. 1). In any instance, the access control service 174 may authorize the client devices 120 to access the email resources 165 by providing the client devices 120 with a means of accessing the email resources 165. In one embodiment, the access control service 174 may authorize the client devices 120 to access at least one unmodified email resource 165. In another embodiment, the access control service 174 may authorize the client devices 120 to access at least one email resource 165 that has been modified by the access control service 174 so that the email resources 165 satisfy the resource rules 171 associated with the email resources 165.

Figure 3:
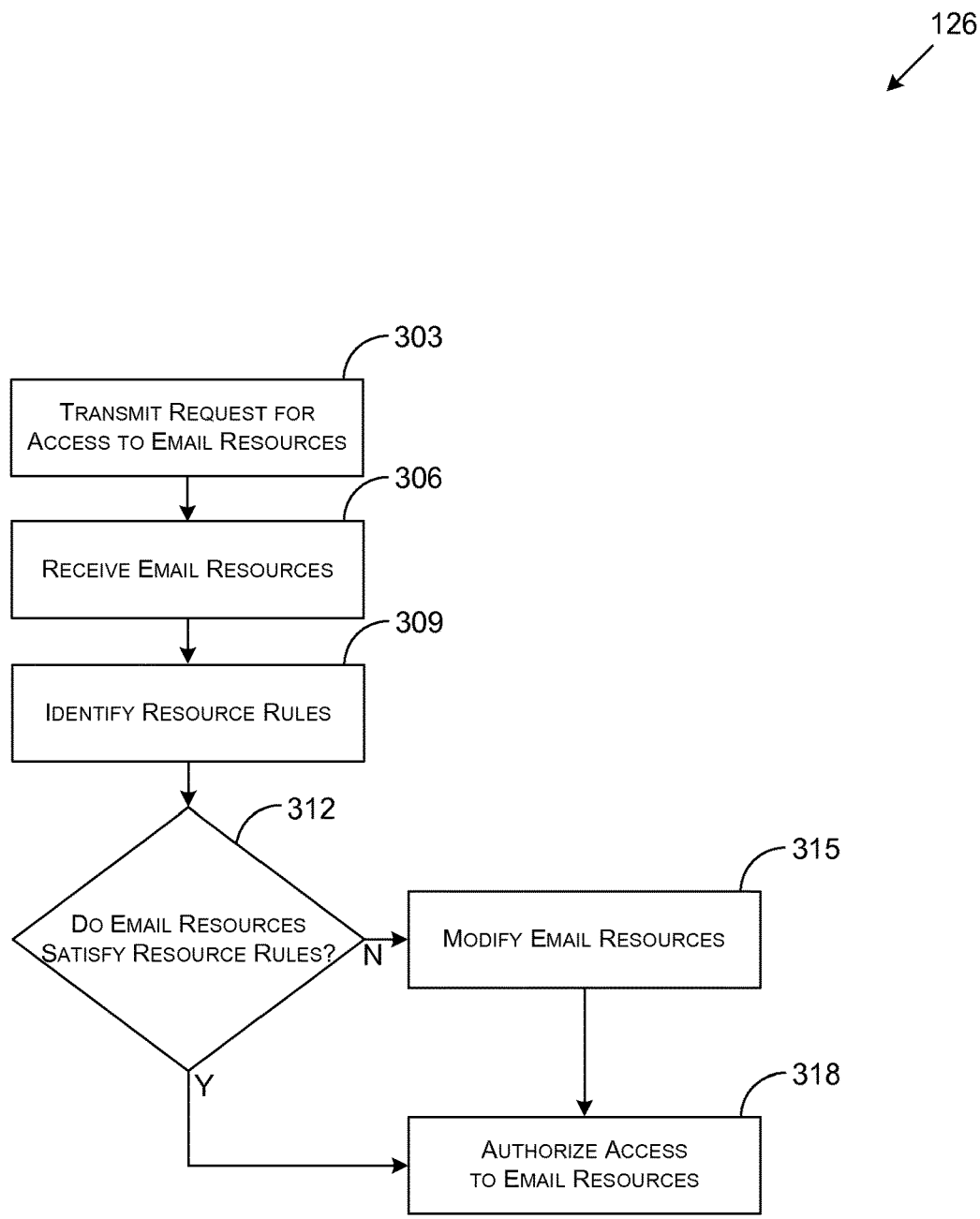
FIG. 3 illustrates a flow diagram of exemplary functionality performed by a client side application executed by a client device in the networked environment of FIG. 1 according to certain embodiments of the present disclosure.

FIG. 3 is a flowchart illustrating exemplary functionality performed by a client side application 126 executed by a client device 120 (FIG. 1) according to certain embodiments. It is understood that the flowchart of FIG. 3 provides merely an example of the many different types of functional arrangements that may be employed to implement the operation of the client side application 126 as described herein. As an alternative, the flowchart of FIG. 3 may be viewed as depicting an example of steps of a method implemented in the client device 120 according to at least one embodiment.

Beginning with step 303, the client side application 126 may transmit at least one request 177 to access at least one email resource 165. In certain embodiments, the client side application 126 may transmit requests 177 to an access control service 174 (FIG. 1). In some embodiments, the requests 177 may include a listing of specific email resources 165 that the client device 120 seeks to access. In other embodiments, the requests 177 may include an indication that the client device 120 seeks access to email resources 165 associated with the client device 120, such as email resources 165 addressed to the user of the client device 120. In any instance, the requests 177 may include data from the data store 122 (FIG. 1) of the client device 120, such as device profiles 123 (FIG. 1), user identifiers 132 (FIG. 1), and device identifiers 135 (FIG. 1) associated with the client device 120, as described herein.

Next, in step 306, the client side application 126 may receive at least one email resource 165. In certain embodiments, the client side application 126 may receive at least one email resource 165 from an access control service 174 executed by an access control server 150. In one embodiment, the client side application 126 may directly receive the email resources 165 from the access control service 174. In another embodiment, the client side application 126 may receive at least one indication from the access control service 174 that specifies that the email resources 165 are available for download from the access control service 174. In such embodiment, the client side application 126 may request to download the email resources 165 from the access control service 174 in response to receiving an indication that the email resources 165 are available for download from the access control service 174. In some embodiments, the client side application 126 may receive at least one email resource 165 from an enterprise email service, such as Microsoft Exchange, Lotus Notes, Novell GroupWise, Zimbra and/or other services capable of distributing email resources 165 to client devices 120.

Then, in step 309, the client side application 126 may identify at least one resource rule 171 (FIG. 1). In certain embodiments, the client side application 126 may identify at least one resource rule 171 associated with at least one email resource 165. In some embodiments, the resource rules 171 may be associated with multiple email resources 165 and the email resources 165 may be associated with multiple resource rules 171, as described herein. In one embodiment, the resource rules 171 may be associated with the email resources 165 if the resource rules 171 are embedded within the email headers, email bodies, email signatures, and/or email footers of the email resources 165. In particular, the email resources 165 may include embedded metadata and/or other instructions that represent at least one resource rule 171. In another embodiment, the resource rules 171 may be associated with the email resources 165 if the resource rules 171 are affixed to the email resources 165, such as attachments to the email resources 165. In yet another embodiment, the resource rules 171 may be associated with the email resources 165 according to a listing of associated email resources 165 and resource rules 171. In any instance, the resource rules 171 may regulate access to the email resources 165 associated with the resource rules 171 by the client devices 120 associated with the email resources 165, as described herein.

Next, in step 312, the client side application 126 may determine whether the email resources 165 satisfy the resource rules 171 associated with the email resources 165. In certain embodiments, the client side application 126 may determine that the client device 120 associated with the email resources 165 is authorized to access the email resources 165 if the email resources 165 satisfy the associated resources rules 171. In any instance, the client side application 126 may determine whether the state of the email resources 165 satisfies the requirements specified by the associated resource rules 171. In particular, the client side application 126 may determine whether the email headers, email sender fields, email CC fields, email BCC fields, email recipient fields, email subject fields, email bodies, email signatures, email footers, and/or email attachments of the email resources 165 satisfy the associated resource rules 171, as described herein.

If the client side application 126 determines that the email resources 165 do not satisfy the resource rules 171, then the client side application 126 may proceed to step 315 and may modify the email resources 165. In certain embodiments, the client side application 126 may modify the email resources 165 so that the email resources 165 satisfy the resource rules 171 associated with the email resources 165. In some embodiments, the client side application 126 may modify at least one portion of the email resources 165. In other embodiments, the access control service 174 may modify portions of and/or the entirety of the email resources 165. In any instance, the client side application 126 may modify the email resources 165 by formatting, encoding, configuring, adding, removing, stripping, moving, replacing and/or flagging portions of the email resources 165, as described herein.

On the contrary, if the client side application 126 determines that the email resources 165 satisfy the resource rules 171, then the client side application 126 may proceed to step 318 and may authorize the client device 120 to access the email resources 165. In certain embodiments, the client side application 126 may authorize the client device 120 to access the email resources 165 by providing the client devices 120 with a means of accessing the email resources 165. For example, the client side application 126 may enable storing, installing, activating, rendering and/or executing the email resources 165 on the client device 120, as described herein. In one embodiment, the client side application 126 may authorize the client device 120 to access at least one unmodified email resource 165. In another embodiment, the client side application 126 may authorize the client device 120 to access at least one email resource 165 that has been modified by the access control service 174 so that the email resources 165 satisfy the resource rules 171 associated with the email resources 165. In yet another embodiment, the client side application 126 may authorize the client device 120 to access at least one email resource 165 that has been modified by the client side application 126 so that the email resources 165 satisfy the resource rules 171 associated with the email resources 165.

Figure 4:
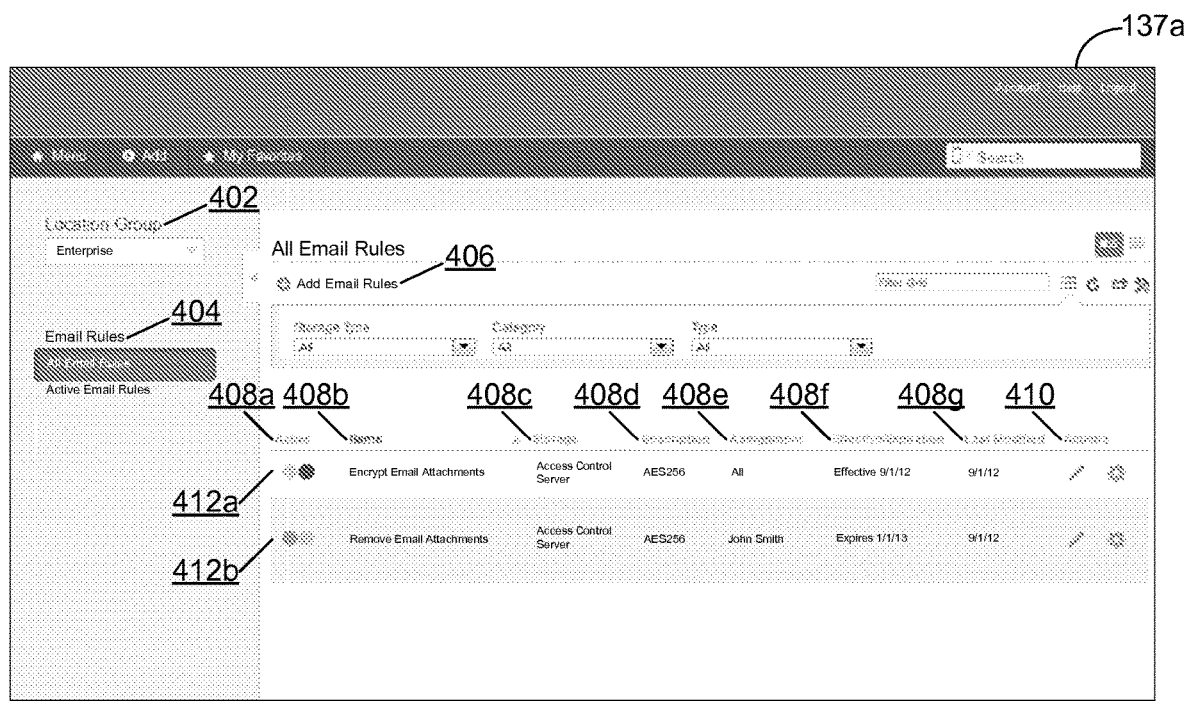
FIGS. 4-5 are exemplary user interfaces rendered by an access control service executed by an access control server in the networked environment of FIG. 1 according to certain embodiments of the present disclosure.

FIG. 4 is an example of a user interface 137a that allows an administrator of an access control service 174 (FIG. 1) to associate at least one resource rule 171 (FIG. 1) with at least one email resource 165 (FIG. 1). In certain embodiments, the user interface 137a may include a grouping view field 402, a rules view field 404, an add rules button 406, at least one rules description field 408, at least one action button 410, and at least one defined rule 412.

The grouping view field 402 may allow the administrator to select a group of client devices 120 (FIG. 1) and/or a group of users of client devices 120 to manage. For example, the administrator may manipulate the resource rules 171 that apply to the "Enterprise" group of client devices 120 by selecting the "Enterprise" grouping from the pull-down provided by the grouping view field 402. The rules view field 404 may allow the administrator to filter the resource rules 171 to manage. For instance, the administrator may filter the resource rules 171 by either selecting the "All Email Rules" set of resource rules 171 or the "Active Email Rules" set of resource rules 171 from the options provided by the rules view field 404.

The add rules button 406 may allow the administrator to add new resource rules 171 to the collection of resource rules 171 that apply to the "Enterprise" group of client devices 120. For example, invoking the add rules button 406 may instruct the access control service 174 to provide another user interface 137 in which the administrator may define at least one new resource rule 171, as will be described in FIG. 5. The rules description fields 408 may specify at least one characteristic that describe each of the resource rules 171. For instance, the rules description fields 408 may include indications of whether a rule is active 408a, a name of a rule 408b, a storage location of a rule 408c, a brief description of a rule 408d, an assignment of a rule 408e, an effective date and/or expiration date of a rule 408f, and a last modified date of a rule 408g. The action buttons 410 may allow an administrator to take at least one action to a resource rule 171, such as editing the resource rule 171 and/or adjusting the settings of a resource rule 171. The defined rules 412 may include at least one resource rule 171 that has been previously created by an administrator of the access control service 174, such as the "Encrypt Email Attachments" rule 412a and the "Remove Email Attachments" rule 412b.

Figure 5:
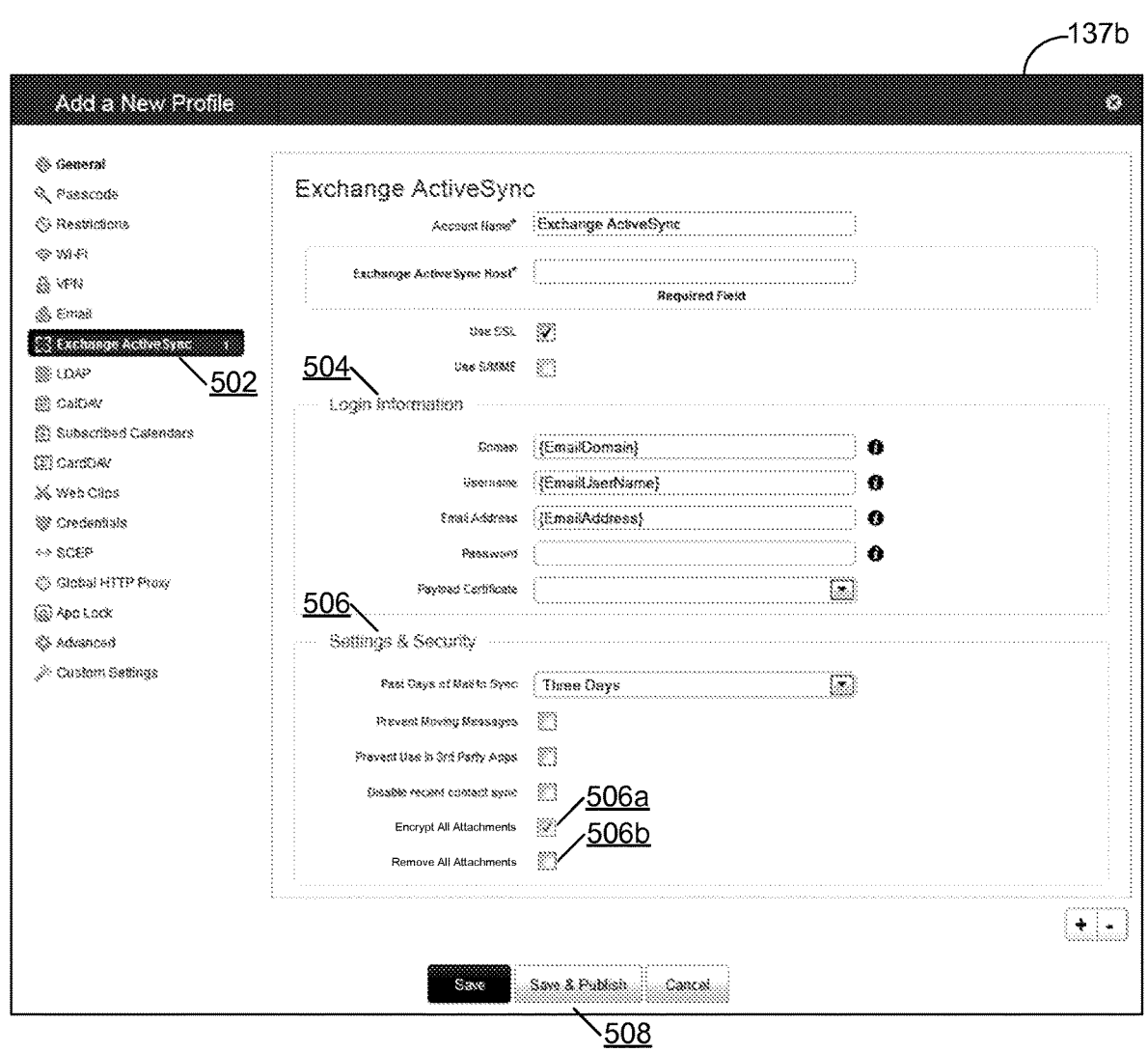

FIG. 5 is an example of a user interface 137b that allows an administrator of an access control service 174 (FIG. 1) to create at least one new resource rule 171 (FIG. 1), which may provide and/or control access to at least one application and/or service accessible to at least one client device 120 (FIG. 1). In certain embodiments, the user interface 137b may include a rule type field 502, an access credentials field 504, an access rights field 506, and at least one action button 508. In some embodiments, the access rights field 506 may include an "Encrypt All Attachments" button 506a and a "Remove All Attachments" button 506b.

The rule type field 502 may include one or more types of resource rules 171 that may be created through the user interface 137b. For example, an administrator of the access control service 174 may select "Exchange ActiveSync" from the rules type field 502 to create resource rules 171 associated with email resources 165 (FIG. 1). The access credentials field 504 may include at least one field that accepts input of at least one credential for access to at least one application and/or service accessible to the client devices 120. For instance, an administrator of the access control service 174 may input the "Domain," "Username," "Email Address," "Password," and "Payload Certificates" associated with the client devices 120. The access rights field 506 may include at least one access right that may be defined for the client devices 120, which may control access by client devices 120 to applications and/or services. For example, an administrator of the access control service 174 may apply at least one access restriction including "Prevent Moving Messages," "Prevent Use in 3rd Party Apps," "Disable recent contact sync," "Encrypt All Attachments" 506a, and "Remove All Attachments" 506b. As a further example, an administrator of the access control service 174 may apply at least one access restriction including "Remove All URLs," "Encrypt All URLs," "Hash All URLs," and "Encrypt/Hash All URLs" (not shown in FIG. 5). The action buttons 508 may include at least one button that saves and/or deletes the resource rules 171 defined in the user interface 137b. For example, an administrator of the access control service 174 may invoke the "Save" action button 508 to store the resource rules 171 associated with the email resources 165 in the data store 153 (FIG. 1) of the access control server 150 (FIG. 1).

Figure 6:
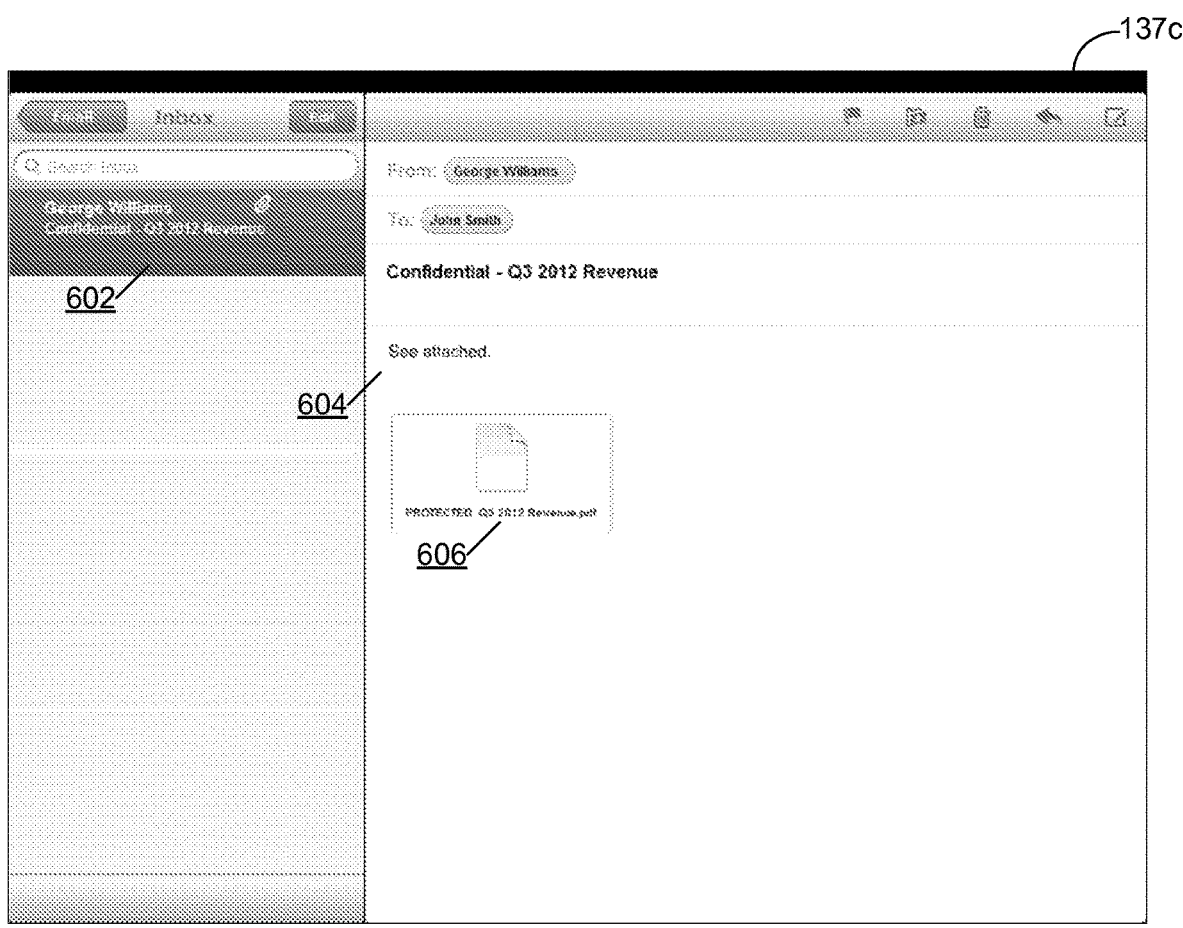
FIGS. 6-11 are exemplary user interfaces rendered by a client side application executed by a client device in the networked environment of FIG. 1 according to certain embodiments of the present disclosure.

FIG. 6 is an example of a user interface 137c executed by a client side application 126 (FIG. 1) on a client device 120 (FIG. 1). In certain embodiments, the client side application 126 may be an application native to the client device 120 that is capable of receiving and/or rendering email resources 165 (FIG. 1). For example, the client side application 126 may be a native email application, such as Microsoft Outlook or Apple Mail. The client side application 126 may include an email selection field 602 and an email viewing pane 604. The email selection field 602 may include at least one email message that may be selected to access within the email viewing pane 604. For example, the user of the client device, such as "John Smith," may select an email message entitled "Confidential—Q3 2012 Revenue" sent to "John Smith" from "George Williams." The email viewing pane 604 may include a sender field, a recipient field, a title field, a body field, and at least one attachment 606. For instance, the email viewing pane 604 may provide a user of a client device 120 with access to the attachment entitled "PROTECTED: Q3 2012 Revenue.pdf." As a further example, the email viewing pane 604 may provide the user of the client device 120 with access to a modified URL within the email resources 165, such as "SECURE BROWSER: www.google.com" (not shown in FIG. 6).

Figure 7:
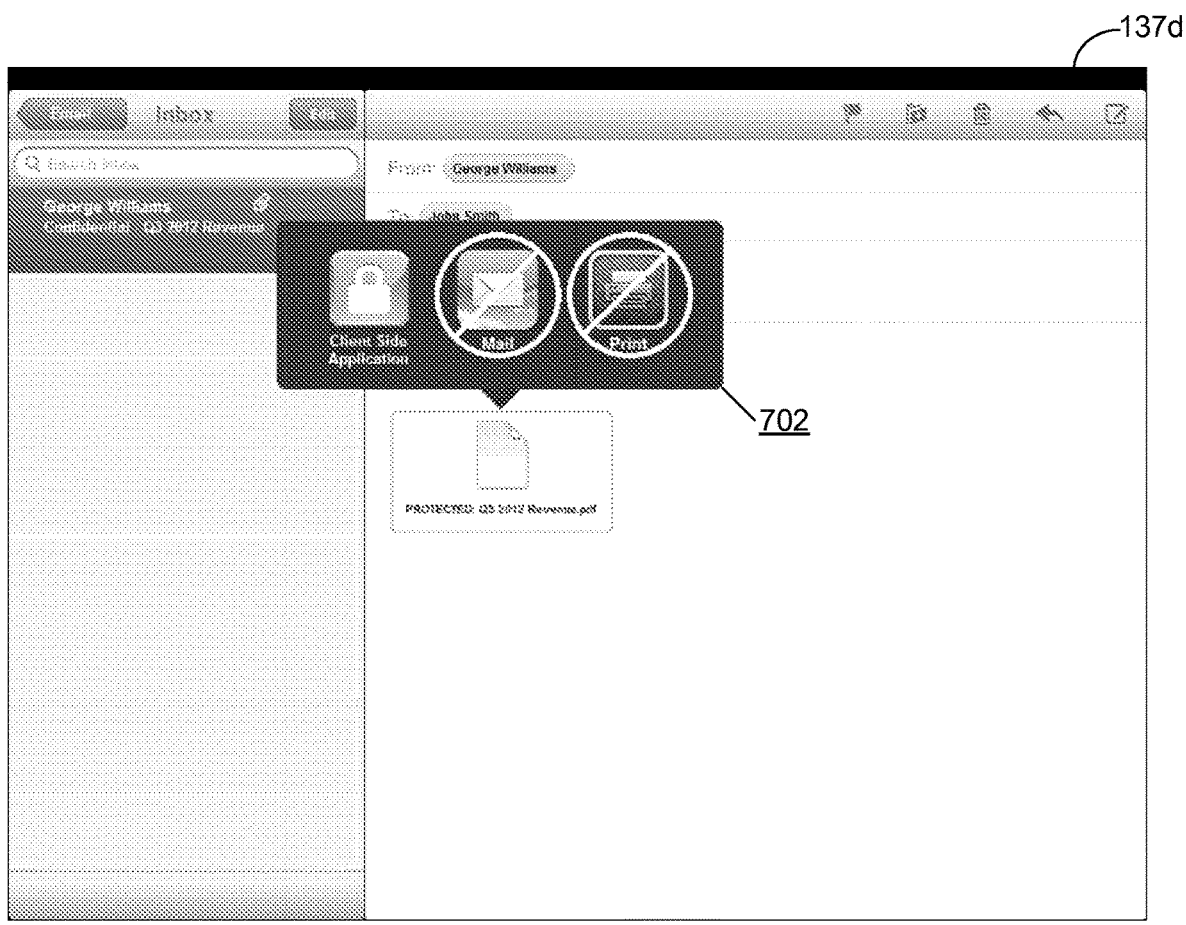

FIG. 7 is an example of a user interface 137d executed by a client side application 126 (FIG. 1) on a client device 120 (FIG. 1). In certain embodiments, the client side application 126 may be an application native to the client device 120 that is capable of receiving and/or rendering email resources 165 (FIG. 1). For example, the client side application 126 may be a native email application, such as Microsoft Outlook or Apple Mail, as similarly described in FIG. 6. In some embodiments, the user of the client device 120 may request to access the attachment entitled "PROTECTED: Q3 2012 Revenue.pdf" by selecting the attachment on the user interface 137d. In other embodiments, the user of the client device 120 may request to access a URL entitled "SECURE BROWSER: www.google.com" by selecting the URL on the user interface 137d (not shown in FIG. 7). In any instance, the attachment entitled "PROTECTED: Q3 2012 Revenue.pdf" and the URL entitled "SECURE BROWSER: www.google.com" may be associated with resource rules 171 (FIG. 1) that specify that the email resources 165 may only be accessed via a secure container application.

The user interface 137d may provide an access selection field 702 to provide the user of the client device 120 with at least one access application and/or service that is capable of accessing the email resources 165 in accordance with the associated resource rules 171. For example, the access selection field 702 may specify that a client side application 126 with secure container and/or secure browsing capabilities may be selected, a client side application 126 with native email and/or browsing capabilities may not be selected, and a printing function of the client device 120 may not be selected. By selecting the client side application 126 with secure container and/or browsing capabilities from the access selection field 702, the current client side application 126 with native email capabilities may call on the client side application 126 with secure container and/or browser capabilities in order to access the email resources 165 in accordance with the relevant resource rules 171.

Figure 8:
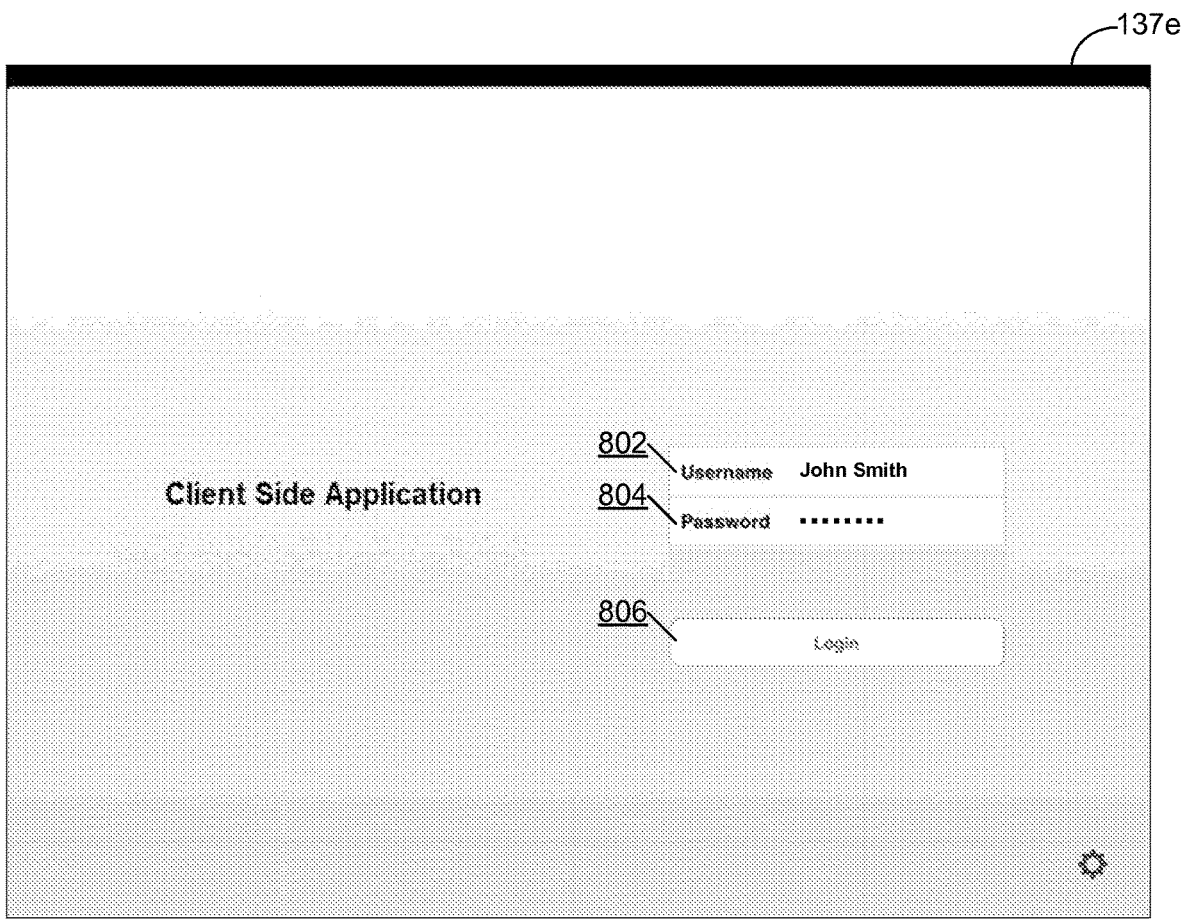

FIG. 8 is an example of a user interface 137e executed by a client side application 126 (FIG. 1) on a client device 120 (FIG. 1). In certain embodiments, the client side application 126 may be a secure container and/or secure browser application that is capable of receiving and/or rendering email resources 165 (FIG. 1), as described herein. In some embodiments, the user interface 137e may provide an authentication form which must be filled out by the user of the client device 120 in order to gain access to at least one email resource 165 accessible through the secure container and/or secure browser environment of the client side application 126. In particular, the user interface 137e may provide an authentication form that includes a username field 802, a password field 804, and a login button 806. A user of the client device 120, such as "John Smith," may provide a username, such as "John Smith," in the username field 802, may provide a password, such as "••••••••," and may invoke the login button 806 to provide the access credentials to the client side application 126. Responsive to a determination that the access credentials provided by the user of the client device 120 are authorized, the client side application 126 may provide the user of the client device 120 with access to the secure container environment of the client side application 126.

Figure 9:
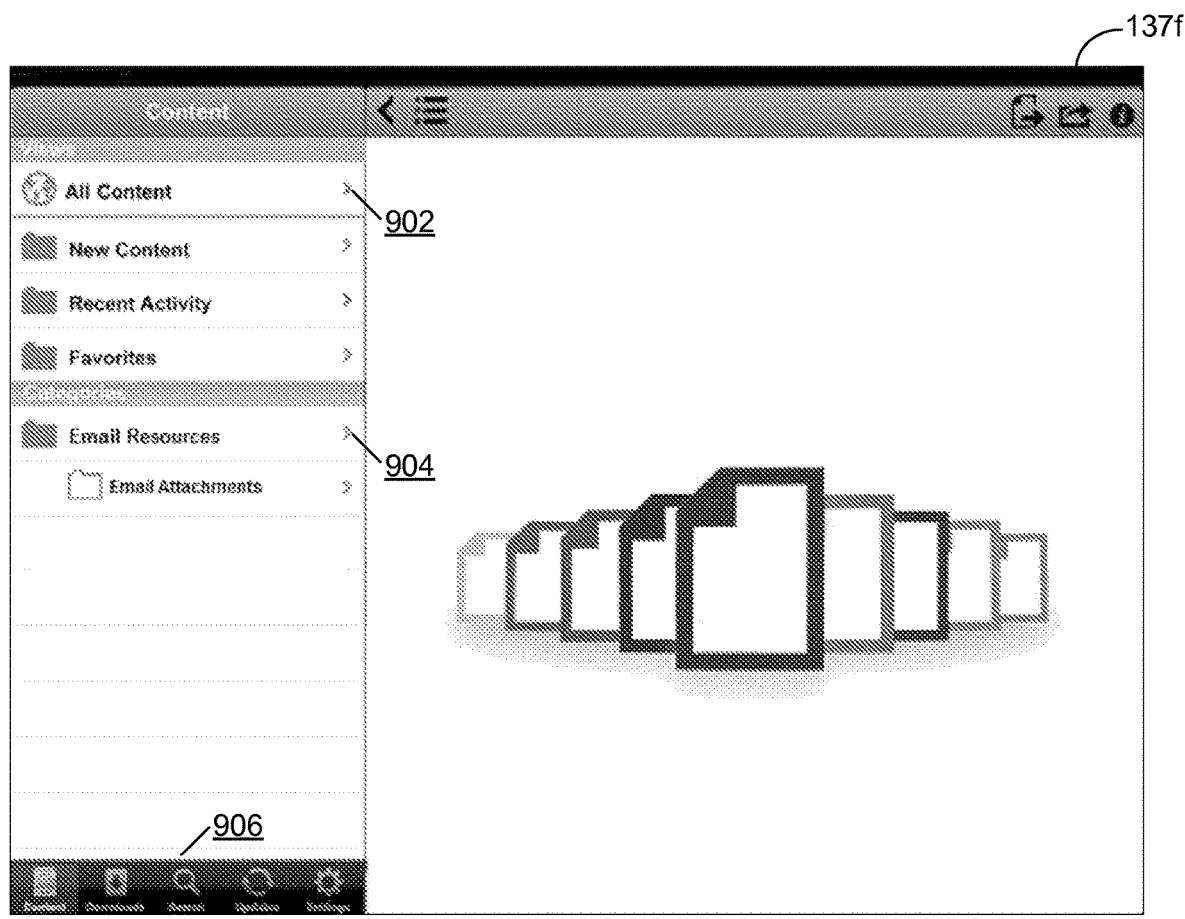

FIG. 9 is an example of a user interface 137f executed by a client side application 126 (FIG. 1) on a client device 120 (FIG. 1). In certain embodiments, the client side application 126 may be a secure container and/or secure browser application that is capable of receiving and/or rendering email resources 165 (FIG. 1), as described herein. The secure container and/or secure browser environment of the client side application 126 may include a views pane 902, a categories pane 904, and action buttons 906. The views pane 902 may include at least one view that is accessible to the user of the client device 120, such as an "all content" view, a "new content" view, a "recent activity" view, and a "favorites" view. The user of the client device 120 may select one of the available views, each of which may include a subset of email resources 165 related to the certain view. The categories pane 904 may include at least one category of email resources 165 that are available to the user of the client device 120, such as an "Email Attachments" category that is a subset of an "Email Resources" category. Similarly, the categories pane 904 may further include a "URLs" category that is a subset of an "Email Resources" category, which is not shown in FIG. 9. The user of the client device 120 may, for instance, select the "Email Attachments" and/or "URLs" category to access at least one email attachment and/or URL that is configured to be accessible via the secure container and/or secure browser environment of the client side application 126, respectively. The action buttons 906 may include a "Content" button, a "Downloads" button, a "Search" button, an "Updates" button, and a "Settings"

button that may launch other user interfaces 137 provided by the client side application 126 to enable additional views, applications, and/or services.

Figure 10:
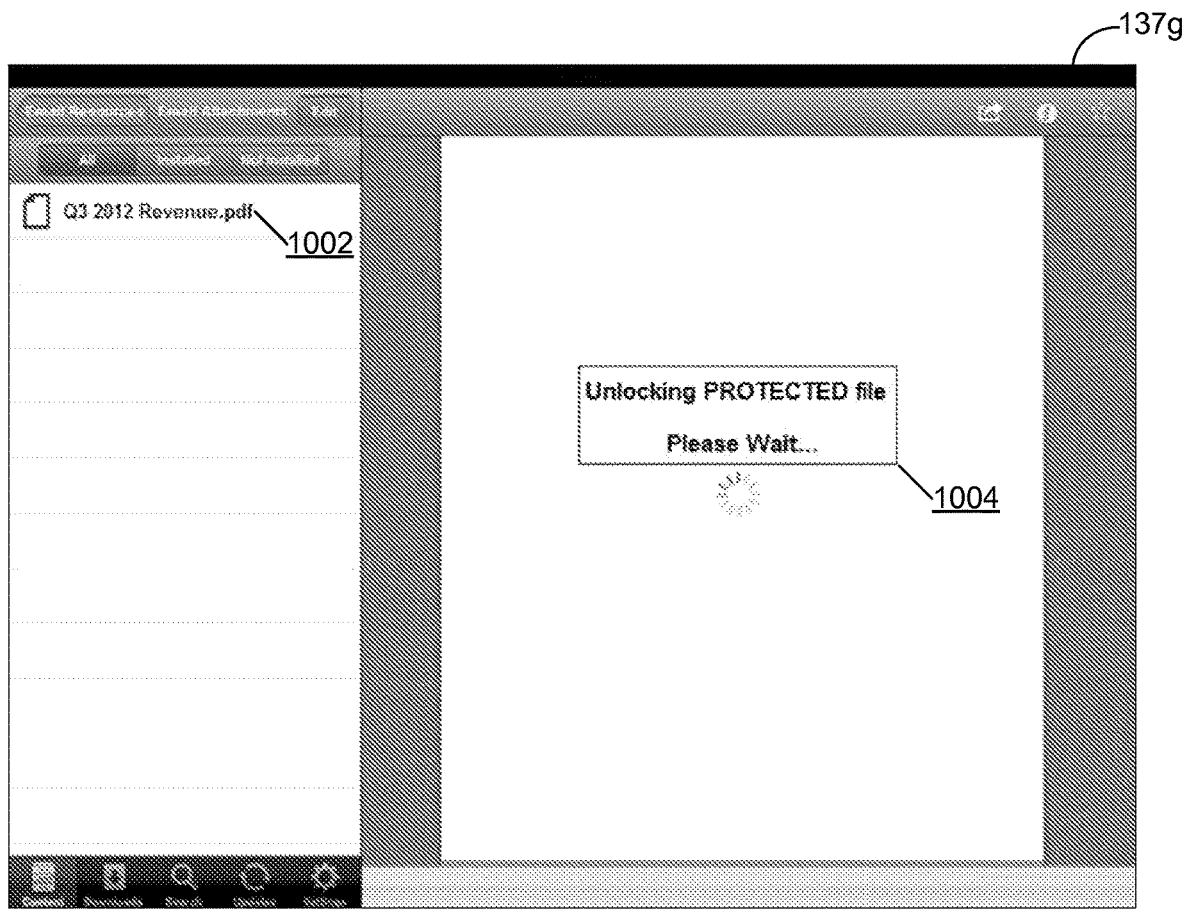

FIG. 10 is an example of a user interface 137g executed by a client side application 126 (FIG. 1) on a client device 120 (FIG. 1). In certain embodiments, the client side application 126 may be a secure container and/or secure browser application that is capable of receiving and/or rendering email resources 165 (FIG. 1), as described herein. The secure container and/or secure browser environment of the client side application 126 may include an accessible resource listing 1002 and an access notification 1004. The user of the client device 120 may select an email resource 165, such as an email attachment or URL, from the accessible resource listing 1002.

In one embodiment, responsive to the user of the client device 120 selecting the "Q3 2012 Revenue.pdf" email resource 165 from the accessible resource listing 1002, the client side application 126 may provide the user with access to the email resource 165 by unlocking the protected file. In particular, the email resource 165 may have been encrypted with a symmetric cryptographic key and/or an asymmetric cryptographic key by an access control service 174 (FIG. 1) according to at least one resource rule 171 (FIG. 1) associated with the email resource 165, as described herein. Consequently, the client side application 126 may decrypt the email resource 165 to enable access to the email resource 165 and may provide an access notification 1004 that specifies that the client side application 126 is "Unlocking (the) PROTECTED file" and to "Please Wait" to access the email resource 165 while the client side application 126 unlocks the email resource 165.

In another embodiment, responsive to the user of the client device 120 selecting a URL entitled "SECURE BROWSER: www.google.com" from the accessible resource listing 1002 (not shown in FIG. 10), the client side application 126 may provide the user with access to the email resource 165 within a secure browser application. In particular, if the current client side application 126 determines that it is not a secure browser application, the client side application 126 may prompt the user with an access notification 1004 that states that the current browser is not capable of launching the URL. Upon transmitting a notification to the user that the client side application 126 is not fit to open the URL, the client device 120 may launch a client side application 126 with secure container and/or secure browsing capabilities.

Figure 11:
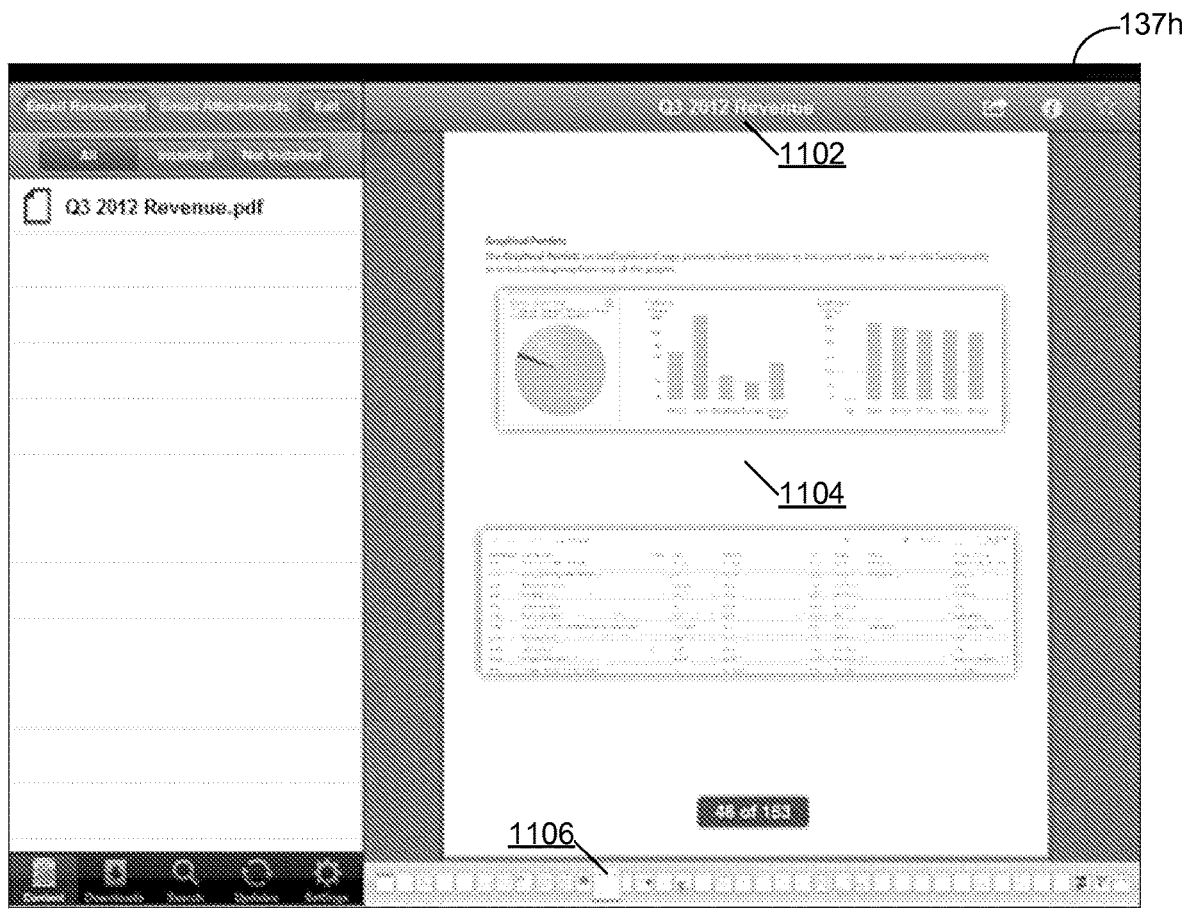

FIG. 11 is an example of a user interface 137h executed by a client side application 126 (FIG. 1) on a client device 120 (FIG. 1). In certain embodiments, the client side application 126 may be a secure container and/or secure browser application that is capable of receiving and/or rendering email resources 165 (FIG. 1), as described herein. The client side application 126 may include a resource title pane 1102, a resource content pane 1104 and a resource page selection pane 1106. The resource title pane 1102 may specify the title of the email resources 165, such as "Q3 2012 Revenue" and/or "www.google.com" (not shown in FIG. 11). The resource content pane 1104 may include the body of the email resources 165, such as the pages of the PDF file "Q3 2012 Revenue" or the pages of the website "www.google.com." The resource page selection pane 1106 may include at least one page of the email resources 165. The user of the client device 120 may, for example, select a page from the resource page selection pane 1106. Responsive to the user of the client device 120 selecting a certain page from the resource page selection pane 1106, the client side application 126 may navigate to the selected page and present the content of the selected page in the resource content pane 1104.

Figure 12:
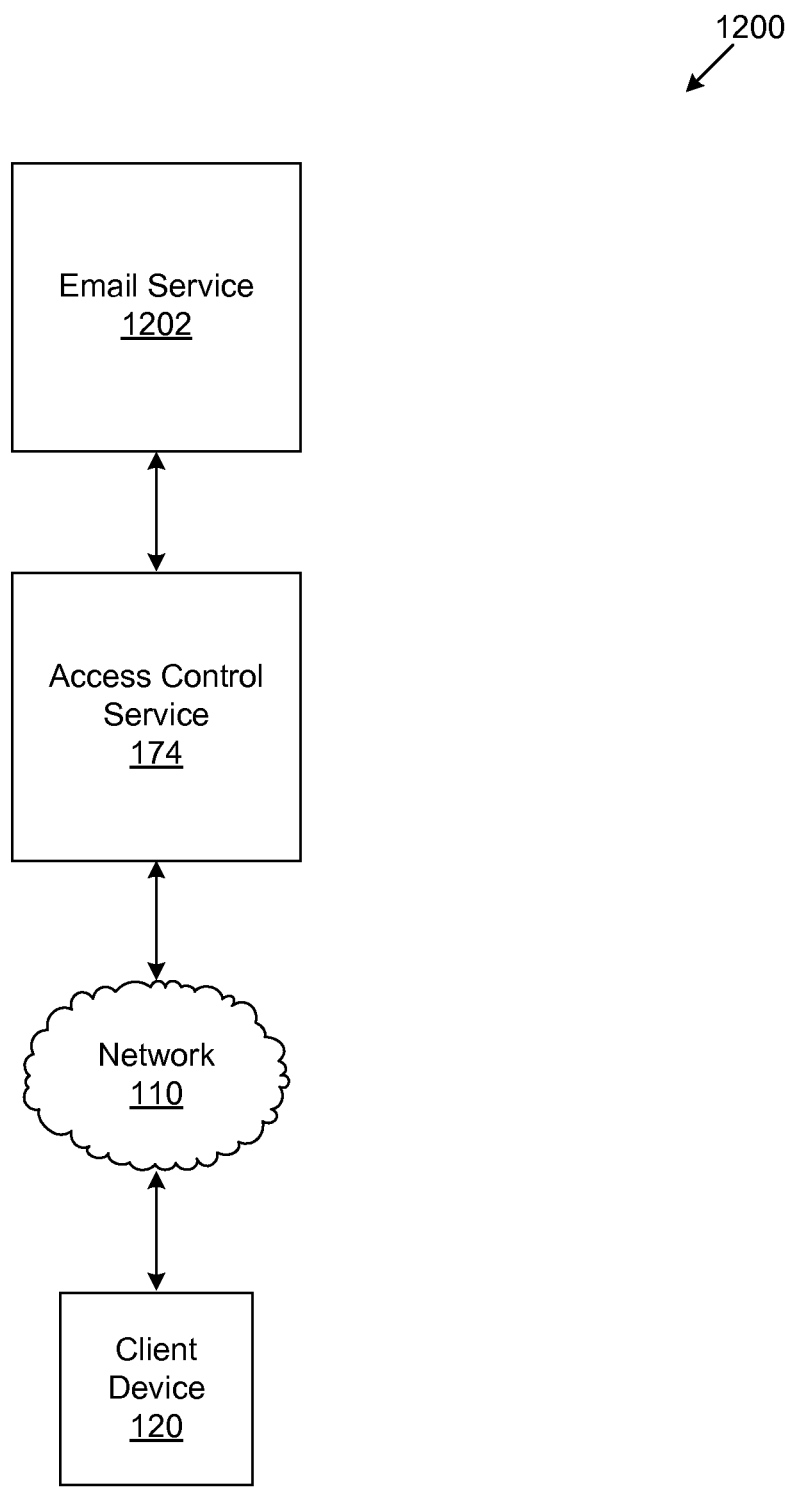
FIG. 12 illustrates a block diagram of a networked environment according to certain embodiments of the disclosure.

FIG. 12 depicts certain illustrative components for a networked environment 1200 according to various embodiments. In certain embodiments, the networked environment 1200 may include at least one network 110, at least one client device 120, an access control service 174, and at least one email service 1202. The email services 1202 may be configured to provide the client devices 120 with access to at least one email resource 165 (FIG. 1) associated with the email services 1202. As an example, the email services 1202 may be and/or include at least one enterprise email service, such as Microsoft Exchange, Lotus Notes, Novell GroupWise, Zimbra and/or other services capable of distributing email resources 165 to client devices 120. The access control service 174 may be configured to authorize the client devices 120 to access the email services 1202, may control the manner in which the client devices 120 are authorized to access the email services 1202, and may provide the client devices 120 with access to the email services 1202.

In one embodiment, the access control service 174 may be configured to proxy email resources 165 provided to the client devices 120 by the email services 1202. The access control service 174 may, for instance, proxy all email resources 165 transmitted between the email services 1202 and the client devices 120. More particularly, the networked environment 1200 may be organized so that the access control service 174 is positioned between the email services 1202 and client devices 120, preventing the email services 1202 and client devices 120 from communicating directly. Thus, the access control service 174 may proxy email resources 165 in transit to the client devices 120 from the email services 1202. In another embodiment, the access control service 174 may be configured to provide a gateway for access to the email services 1202. The access control service 174 may, for instance, provide authorized client devices 120 with access to the email services 1202 and deny unauthorized client devices 120 from accessing the email services 1202.

In any instance, the access control service 174 may be configured to determine whether the client devices 120 are authorized to access the email resources 165. The access control service 174 may, for example, receive at least one request 177 (FIG. 1) to access the email services 1202 from the client devices 120. The access control service 174 may determine whether the client devices 120 associated with the requests 177 are authorized to access the email services 1202 based on, for instance, at least one device profile 123 (FIG. 1), at least one user identifier 132 (FIG. 1), at least one device identifier 135 (FIG. 1) associated with the client device 120, which may be included in the requests 177. The access control service 174 may provide the client devices 120 with access to the email services 1202 in response to a determination that the client devices 120 are authorized to access the email services 1202. In one embodiment, the access control service 174 may establish a communicative connection between the email services 1202 and the client devices 120, which may facilitate the transmission of email resources 165 between the email services 1202 and the client devices 120. In another embodiment, the access control service 174 may establish a communicative connection between the access control service 174 and the client devices 120, which may facilitate the transmission of email resources 165 associated with the email service 1202 between the access control service 174 and the client devices 120.

Additionally, the access control service 174 may be configured to control access to the email resources 165 by the client devices 120. The access control service 174 may determine which email resources 165 the client devices 120 are authorized to access. The access control service 174 may also modify the email resources 165 before providing the client devices 120 with access to the email resources 165. In one embodiment, the access control service 174 may remove and/or strip at least one uniform resource locator (URL) from the email resources 165 in accordance with at least one resource rule 171 (FIG. 1) associated with the email resources 165. More specifically, the resource rules 171 may specify that URLs within the header, body, footer, or any other portion of the email resources 165 must be removed. In another embodiment, the access control service 174 may modify and/or configure at least one URL to be exclusively accessible via at least one client side application 126 (FIG. 1) on the client devices 120. For example, the access control service 174 may modify URLs that were configured to direct the client device 120 to a location via a native browser application so that the URLs will direct the client device 120 to the location via a certain secure browser application, such as the client side application 126.

In yet another embodiment, the access control service 174 may modify at least one URL by encrypting the URLs based at least in part on at least one encryption key. The access control service 174 may further, for example, pair the encrypted URLs with at least one decryption key capable of decrypting the URLs. It is to be understood that either symmetric or asymmetric encryption may be employed to encrypt the URLs by the access control service 174, and that the access control service 174 may provide the client devices 120 with the appropriate decryption key based on the type of encryption used to encrypt the URLs. Accordingly, if the access control service 174 utilizes symmetric encryption, then the access control service 174 may pair the encrypted URLs with the key used to encrypt the URLs; on the contrary, if the access control service 174 utilizes asymmetric encryption, then the access control service 174 may pair the encrypted URLs with a decryption key corresponding to the encryption key used to encrypt the URLs. In a further embodiment, the access control service 174 may modify at least one URL by hashing the URLs based at least in part on at least one cryptographic hash function. The access control service 174 may further, for example, pair the hashed URLs with at least one cryptographic hash function that may confirm for the client devices 120 that the URLs were modified by the access control service 174. In a further embodiment, the access control service 174 may modify at least one URL by creating both encrypted URLs based at least in part on at least one encryption key and hashed URLs based at least in part on at least one cryptographic hash function. The access control service 174 may further, for example, pair the modified URLs with both at least one decryption key capable of decrypting the URLs and at least one cryptographic hash function capable of confirming for the client devices 120 that the URLs were modified by the access control service 174. Finally, the access control service 174 may instruct at least one email service 1202 and/or at least one client device 120 to modify at least one URL within at least one email resource 165 in the same manner described in the aforementioned embodiments.

Furthermore, the access control service 174 may be configured to provide the client devices 120 with access to the email services 1202 and/or the email resources 165 associated with the email services 1202. In one embodiment, the access control service 174 may be configured to transmit email resources 165 to the client devices 120. For example, the access control service 174 may establish a secure communicative connection with the client devices 120, such as HTTPS/SSL, through which the access control service 174 may transmit the email resources 165 associated with the email services 1202 to the client devices 120. In another embodiment, the access control service 174 may be configured to transmit instructions to the email services 1202 that specify that the email services 1202 should transmit the email resources 165 to the client devices 120. In any instance, the access control service 174 may provide the client devices 120 with access to email resources 165 with modified URLs, which may include URLs specific to a client side application 126, encrypted URLs, decryption keys specific to the encrypted URLs, hashed URLs, cryptographic hash algorithms specific to the hashed URLs, and/or the like.

Figure 13:
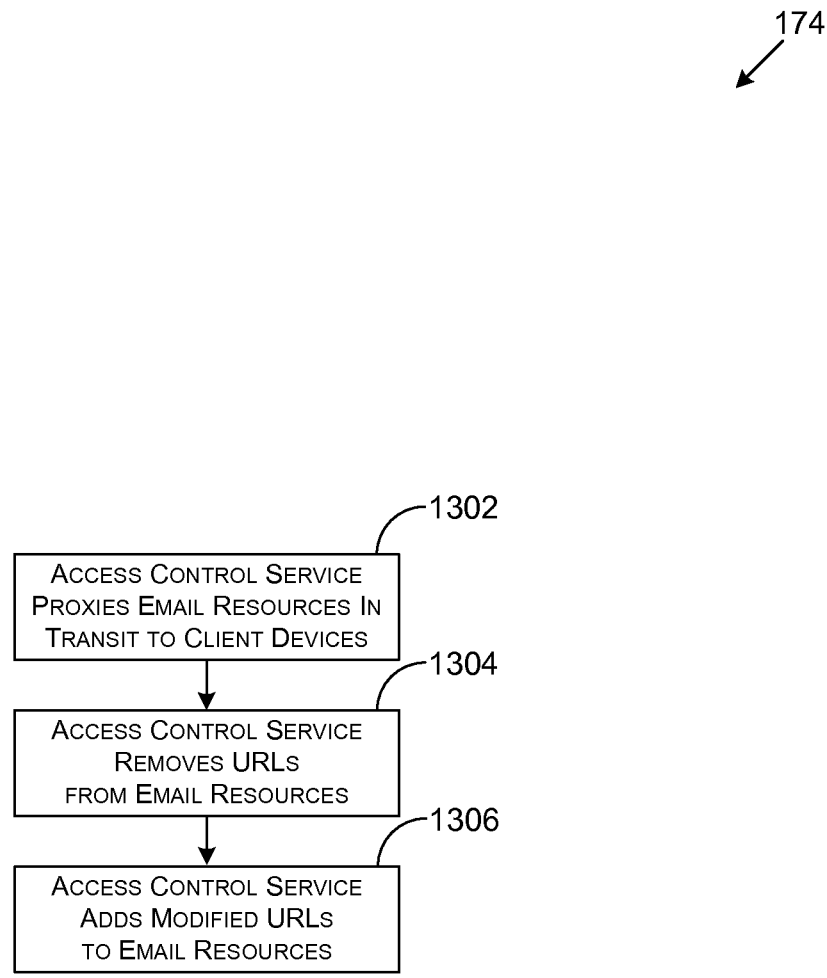
FIG. 13 illustrates a flow diagram of exemplary functionality performed by an access control service executed by an access control server in the networked environment of FIG. 12 according to certain embodiments of the present disclosure.

FIG. 13 is a flowchart illustrating exemplary functionality performed by an access control service 174 executed by an access control server 150 (FIG. 1) according to certain embodiments. It is understood that the flowchart of FIG. 13 provides merely an example of the many different types of functional arrangements that may be employed to implement the operation of the access control service 174 as described herein. As an alternative, the flowchart of FIG. 13 may be viewed as depicting an example of steps of a method implemented in the access control server 150 according to at least one embodiment.

Beginning with step 1302, an access control service 174 may proxy at least one email resource 165 (FIG. 1) in transit to at least one client device 120 (FIG. 1) from at least one email service 1202 (FIG. 12). In one embodiment, the access control service 174 may be configured to proxy all data transmitted between the email services 1202 and the client devices 120. For example, the access control service 174 may identify the email resources 165 in transit to the client devices 120 via the access control service 174 and may prohibit the email resources 165 from proceeding to the client devices 120 as transmitted by the email services 1202. In another embodiment, the access control service 174 may be configured to act as a gateway that controls access to the email services 1202. For instance, the access control service 174 may transmit instructions to the email services 1202 that specify that email resources 165 intended for the client devices 120 must be transmitted to the client devices 120 via the access control service 174.

Next, in step 1304, the access control service 174 may remove at least one URL from the email resources 165. In certain embodiments, at least one resource rule 171 (FIG. 1) may specify that all URLs within the email resources 165 must be removed and/or stripped from the email resources 165 before the client devices 120 are provided with access to the email resources 165. In one embodiment, the access control service 174 may be configured to copy the URLs from the email resources 165 and then remove the URLs from the email resources 165. In another embodiment, the access control service 174 may be configured to store the URLs removed from the email resources 165. For instance, the access control service 174 may store the removed URLs in the data store 153 (FIG. 1) of the access control server 150.

Then, in step 1306, the access control service 174 may add at least one modified URL to the email resources 165. In certain embodiments, at least one resource rule 171 (FIG. 1) may specify that the client devices 120 may be provided with access to the email resources 165 if the email resources 165 only contain modified URLs. In some embodiments, the resource rules 171 may further specify a permitted and/or required means of modification, including the types of cryptographic keys and/or cryptographic hash algorithms employed to modify the email resources 165. In one embodiment, the access control service 174 may modify the original URLs so that the modified URLs direct the client devices 120 to a non-native browser application, such as the client side application 126. In another embodiment, the access control service 174 may encrypt the URLs based at least in part on at least one cryptographic key. In yet another embodiment, the access control service 174 may hash the URLs based at least in part on at least one cryptographic hash algorithm. In a further embodiment, the access control service 174 may encrypt the URLs and may additionally pair the encrypted URL with a hashed URL, as described herein.

In certain embodiments, the access control service 174 may additionally authorize the client devices 120 to access the email resources 165. In one embodiment, the access control service 174 may be configured to transmit at least one email resource 165 to the client devices 120. For example, the access control service 174 may transmit the email resources 165 with removed URLs to the client devices 120. In another embodiment, the access control service 174 may be configured to transmit the email resources 165 with modified URLs to the client devices 120. For instance, the access control service 174 may transmit modified email resources 165 that include URLs specific to a client side application 126, encrypted URLs, decryption keys specific to the encrypted URLs, hashed URLs, and/or cryptographic hash algorithms specific to the hashed URLs to the client devices 120.

Figure 14:
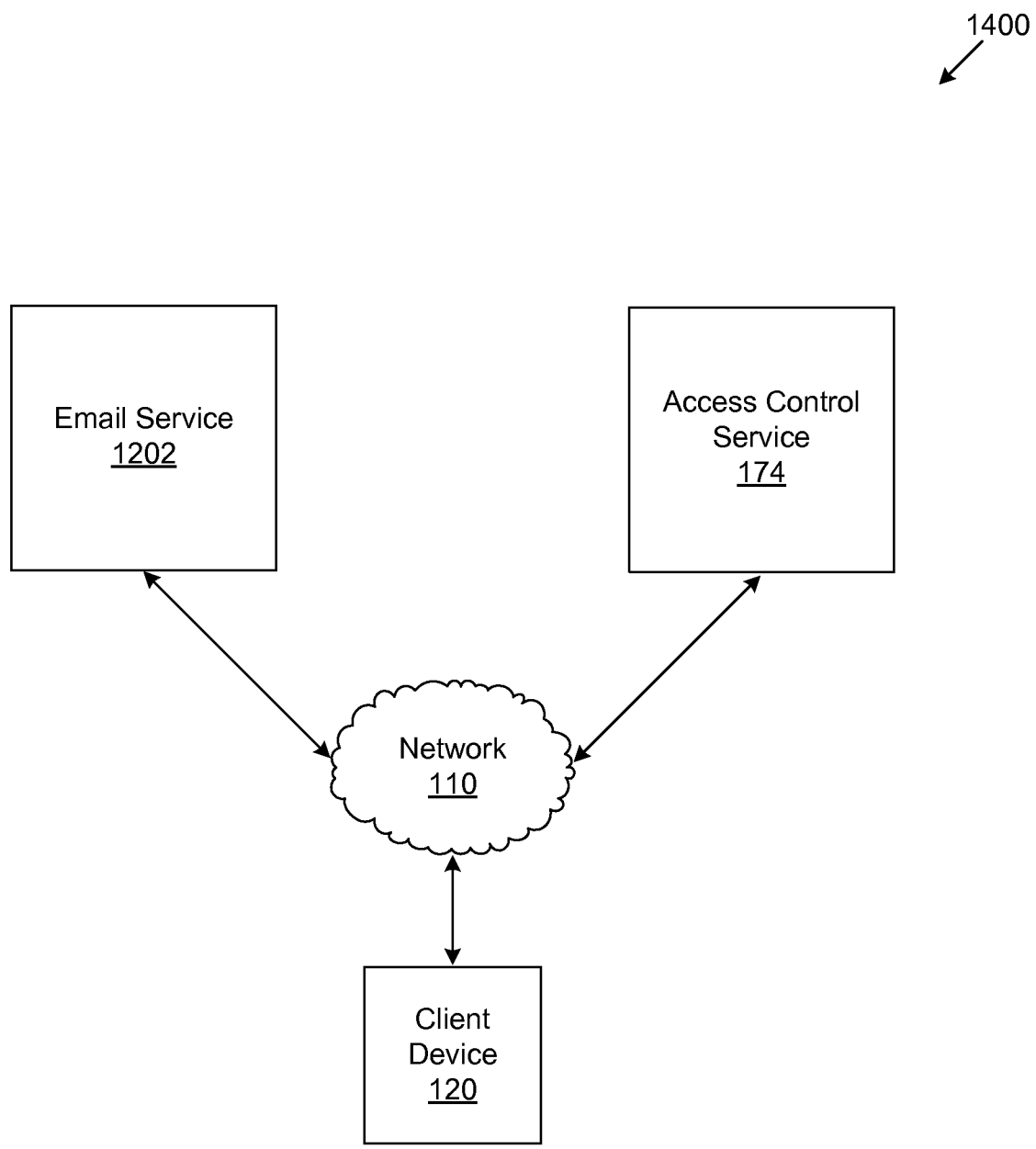
FIG. 14 illustrates a block diagram of a networked environment according to certain embodiments of the disclosure.

FIG. 14 depicts certain illustrative components for a networked environment 1400 according to various embodiments. In certain embodiments, the networked environment 1400 may include at least one network 110, at least one client device 120, an access control service 174, and at least one email service 1202. The networked environment 1400 may be similar to the networked environment 1200 in FIG. 12. While the networked environment 1200 may include the same components as the networked environment 1400, the organization of the components of the two networked environments may differ. In particular, the email services 1202 in the networked environment 1400 may communicate directly with the client devices 120, whereas the access control service 174 in the networked environment 1200 must relay all communications between the email services 1202 and the client devices 120. The access control service 174 of the networked environment 1400 may be configured to determine which email resources 165 (FIG. 1) associated with the email services 1202 may be accessed by the client devices 120, control the manner in which the client devices 120 are authorized to access the email resources 165, and may provide the client devices 120 with access to the email resources 165.

In certain embodiments, the access control service 174 may determine which email resources 165 associated with the email services 1202 may be accessed by the client devices 120 by configuring the email services 1202 and/or at least one client side application 126 (FIG. 1) on the client devices 120. In some embodiments, the access control service 174 may transmit at least one instruction to the email services 1202 and/or client side applications 126 that configure the functionality of the email services 1202 and/or client side applications 126, respectively. As an example, the access control service 174 may utilize an instruction protocol, such as Microsoft PowerShell, to transmit the instructions to an email service 1202, such as Microsoft Exchange. Additionally, the access control service 174 may utilize protocols specific to the client side applications 126 and/or client devices 120, such as an application programming interface (API), to transmit the instructions to the client side applications 126 and/or client devices 120. In one embodiment, the instructions may represent and/or specify at least one resource rule 171 (FIG. 1) that must be satisfied in order to provide the client devices 120 with access to the email resources 165. The resource rules 171 may, for example, specify that all URLs within the email resources 165 must be removed from the email resources 165 before the email resources 165 may be provided to the client devices 120. More specifically, the resource rules 171 may specify that URLs within the header, body, footer, or any other portion of the email resources 165 must be removed. The resource rules 171 may further specify that the removed URLs must be transmitted to the access control service 174, rather than the client devices 120.

Additionally, in certain embodiments, the access control service 174 may control the manner in which the client devices 120 are authorized to access the email resources 165 by configuring the email services 1202 and/or client side applications 126 on the client devices 120 to modify the email resources 165 before they are provided to the client devices 120. In some embodiments, the access control service 174 may transmit instructions to the email services 1202 and/or client side applications 126 on the client devices 120 to modify at least one URL from at least one email resource 165. In one embodiment, the access control service 174 may modify the URLs according to at least one resource rule 171. The resource rules 171 may, for example specify that the URLs must be removed and/or stripped from the email resources 165. The resource rules 171 may further specify that the URLs must be modified to direct the client devices 120 to at least one non-native browser application, encrypted with at least one cryptographic key, and/or hashed with at least one cryptographic hash algorithm. The resource rules 171 may further specify that the modified URLs must be added to the email resources 165 before the client devices 120 are provided access to the email resources 165.

Furthermore, in certain embodiments, the access control service 174 may provide the client devices 120 with access to the email resources 165 by transmitting instructions to the email services 1202 and/or client side applications 126 on the client devices 120 that enable the client devices 120 to access the email resources 165. In some embodiments, the access control service 174 may tailor the authorization instructions in accordance with at least one resource rule 171. For instance, the resource rules 171 may specify that the email resources 165 may only be transmitted from the email services 1202 to the client devices 120 over a secure connection, such as over an HTTPS/SSL connection. In one embodiment, the access control service 174 may transmit instructions that specify that the client devices may access the email resources 165 with removed URLs. In another embodiment, the access control service 174 may transmit instructions that specify that the client devices may access removed and/or modified URLs. In yet another embodiment, the access control service 174 may transmit at least one cryptographic key capable of decoding encrypted URLs and/or at least one cryptographic hash algorithm capable of confirming that URLs were modified by the access control service 174 to the client side applications 126 on the client devices 120.

Figure 15:
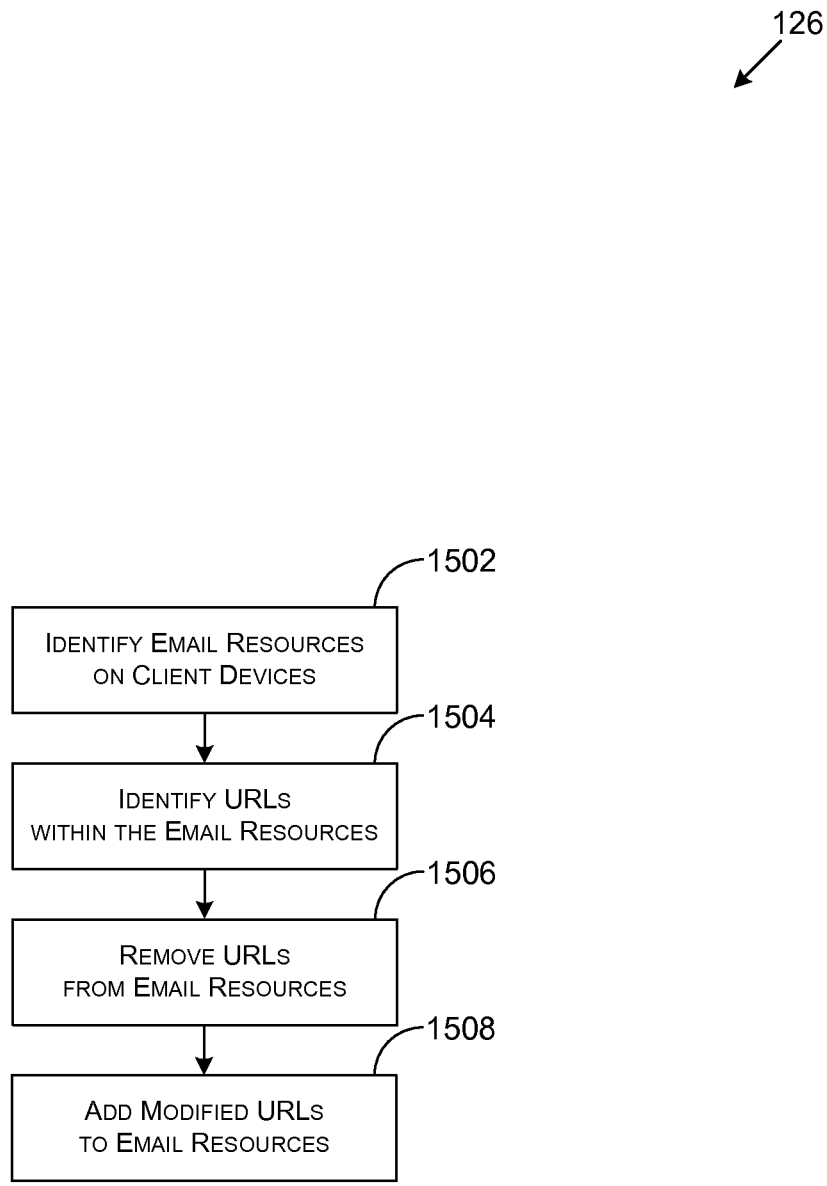
FIG. 15 illustrates a flow diagram of exemplary functionality performed by a client side application executed by a client device in the networked environments of FIGS. 12 and 14 according to certain embodiments of the present disclosure.

FIG. 15 is a flowchart illustrating exemplary functionality performed by a client side application 126 executed by a client device 120 (FIG. 1) according to certain embodiments. It is understood that the flowchart of FIG. 15 provides merely an example of the many different types of functional arrangements that may be employed to implement the operation of the client side application 126 as described herein. As an alternative, the flowchart of FIG. 15 may be viewed as depicting an example of steps of a method implemented in the client device 120 according to at least one embodiment. In any instance, the exemplary functionality of the client side application 126 may be triggered in response to instructions transmitted by an access control service 174 (FIG. 1) executed by an access control server 150 (FIG. 1), as previously disclosed in FIG. 14.

Beginning with step 1502, the client side application 126 may identify at least one email resource 165 (FIG. 1) that is associated with the client device 120. In certain embodiments, the client side application 126 may identify the email resources 165 by receiving the email resources 165 from an email service 1202 (FIG. 12) associated with the email resources 165. For example, the client side application 126 may receive the email resources 165 from a Microsoft Exchange email service 1202. In some embodiments, the client side application 126 may identify the email resources 165 by receiving the email resources 165 from an access control service 174 (FIG. 1) executed by an access control server 150 (FIG. 1).

Next, in step 1504, the client side application 126 may identify at least one URL within the email resources 165. In certain embodiments, the client side application 126 may identify URLs within the header, body, footer, and/or other portions of the email resources 165. In some embodiments, the client side application 126 may identify URLs in the email resources 165 according to at least one resource rule 171 (FIG. 1). For instance, the resource rules 171 may specify that URLs corresponding to a list of unauthorized and/or blacklisted locations must be identified by the client side application 126. In any instance, the client side application 126 may identify URLs from within the header, body, footer, and/or other portions of the email resources 165.

Then, in step 1506, the client side application 126 may remove at least one URL from the email resources 165. In certain embodiments, the client side application 126 may remove URLs from within the header, body, footer, and/or other portions of the email resources 165. In some embodiments, the client side application 126 may remove the URLs identified in step 1504 (FIG. 15) in accordance with at least one resource rule 171 (FIG. 1). For instance, the resource rules 171 may specify that the client side application 126 must remove URLs from the body of the email resources 165 but need not remove the URLs from other portions of the email resources 165.

Next, in step 1508, the client side application 126 may add at least one modified URL to the email resources 165. In certain embodiments, the client side application 126 may modify the URLs removed from the email resources 165 in step 1506 and subsequently add the modified URLs to the email resources 165, thereby replacing the original URLs with modified URLs. In some embodiments, the client side application 126 may modify the URLs in accordance with at least one resource rule 171. In one embodiment, the client side application 126 may modify the original URLs so that the modified URLs direct the client devices 120 to a non-native browser application, such as the client side application 126. In another embodiment, the client side application 126 may encrypt the URLs based at least in part on at least one cryptographic key. In yet another embodiment, the client side application 126 may hash the URLs based at least in part on at least one cryptographic hash algorithm. In a further embodiment, the client side application 126 may encrypt the URLs and may additionally pair the encrypted URL with a hashed URL, as described herein.

Furthermore, the client side application 126 may authorize the client devices 120 to access the email resources 165. In certain embodiments, the client side application 126 may provide the client device 120 with access to the email resources 165 that contain only modified URLs. In one embodiment, the client side application 126 may provide the client device 120 with access to encrypted URLs by utilizing at least one decryption key to decrypt the modified URLs. In another embodiment, the client side application 126 may provide the client device 120 with access to hashed URLs by utilizing at least one cryptographic hash algorithm to confirm that an access control service 174 and/or email service 1202 modified the URL. In any instance, the client side application 126 may provide the client device 120 with access to the email resources 165 by rendering at least one user interface 137 (FIG. 1) on at least one display 136 (FIG. 1) of the client device 120 and presenting the email resources 165 on the user interfaces 137.

Figure 16:
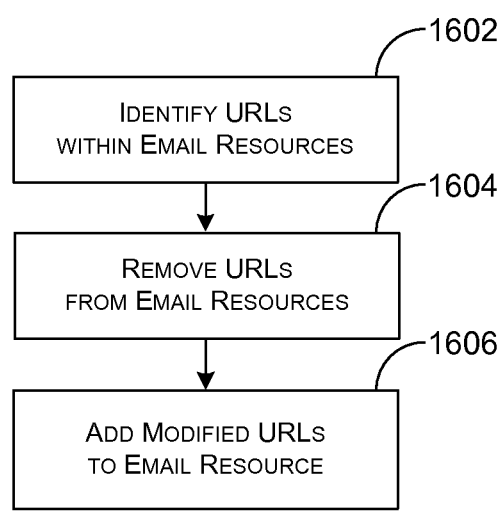
FIG. 16 illustrates a flow diagram of exemplary functionality performed in the networked environments of FIGS. 12 and 14 according to certain embodiments of the present disclosure.

FIG. 16 is a flowchart illustrating exemplary functionality performed by at least one access control service 174 executed by at least one access control server 150 (FIG. 1) and/or at least one client side application 126 executed by at least one client device 120 (FIG. 1) according to certain embodiments. It is understood that the flowchart of FIG. 16 provides merely an example of the many different types of functional arrangements that may be employed to implement the operation of the access control service 174 and/or the client side application 126 as described herein. As an alternative, the flowchart of FIG. 16 may be viewed as depicting an example of steps of a method implemented in the access control server 150 and/or the client device 120 according to at least one embodiment.

Beginning with step 1602, the access control service 174 and/or client side application 126 may identify at least one URL within at least one email resource 165 (FIG. 1). In certain embodiments, the access control service 174 and/or client side application 126 may identify the email resources 165 by receiving the email resources 165 from an email service 1202 (FIG. 12) associated with the email resources 165. For example, the access control service 174 and/or client side application 126 may receive the email resources 165 from a Microsoft Exchange email service 1202. In some embodiments, the client side application 126 may identify the email resources 165 by receiving the email resources 165 from the access control service 174. In other embodiments, the access control service 174 and/or client side application 126 may query the data store 153 (FIG. 1) of the access control server 150 and/or the data store 122 (FIG. 1) of the client device 120 to determine whether the data stores hold email resources 165 that contain URLs. In any instance, the access control service 174 and/or client side application 126 may identify URLs from within the header, body, footer, and/or other portions of the email resources 165.

Next, in step 1604, the access control service 174 and/or client side application 126 may remove at least one URL from the email resources 165. In certain embodiments, the access control service 174 and/or client side application 126 may remove URLs from within the header, body, footer, and/or other portions of the email resources 165. In some embodiments, the access control service 174 and/or client side application 126 may remove the URLs identified in step 1504 in accordance with at least one resource rule 171. For instance, the resource rules 171 may specify that the access control service 174 and/or client side application 126 must remove URLs from the body of the email resources 165, but need not remove the URLs from other portions of the email resources 165.

Then, in step 1606, the access control service 174 and/or client side application 126 may add at least one modified URL to the email resources 165. In certain embodiments, the access control service 174 and/or client side application 126 may modify the URLs removed from the email resources 165 in step 1606 and subsequently add the modified URLs to the email resources 165, thereby replacing the original URLs with modified URLs. In some embodiments, the access control service 174 and/or client side application 126 may modify the URLs in accordance with at least one resource rule 171. In one embodiment, the access control service 174 and/or client side application 126 may modify the original URLs so that the modified URLs direct the client devices 120 to a non-native browser application, such as the client side application 126. In another embodiment, the access control service 174 and/or client side application 126 may encrypt the URLs based at least in part on at least one cryptographic key. In yet another embodiment, the access control service 174 and/or client side application 126 may hash the URLs based at least in part on at least one cryptographic hash algorithm. In a further embodiment, the access control service 174 and/or client side application 126 may encrypt the URLs and may additionally pair the encrypted URL with a hashed URL, as described herein.

Furthermore, the access control service 174 and/or client side application 126 may authorize at least one client device 120 to access the email resources 165. In certain embodiments, the access control service 174 and/or client side application 126 may provide the client devices 120 with access to the email resources 165 that contain only modified URLs. In one embodiment, the access control service 174 and/or client side application 126 may provide the client devices 120 with access to encrypted URLs by utilizing at least one decryption key to decrypt the modified URLs. In another embodiment, the access control service 174 and/or client side application 126 may provide the client device 120 with access to hashed URLs by utilizing at least one cryptographic hash algorithm to confirm that an access control service 174 and/or email service 1202 modified the URL. In any instance, the access control service 174 and/or client side application 126 may provide the client devices 120 with access to the email resources 165 by instructing the client devices 120 to render and/or by rendering at least one user interface 137 (FIG. 1) on at least one display 136 (FIG. 1) of the client device 120 and presenting the email resources 165 on the user interfaces 137.

Figure 17:
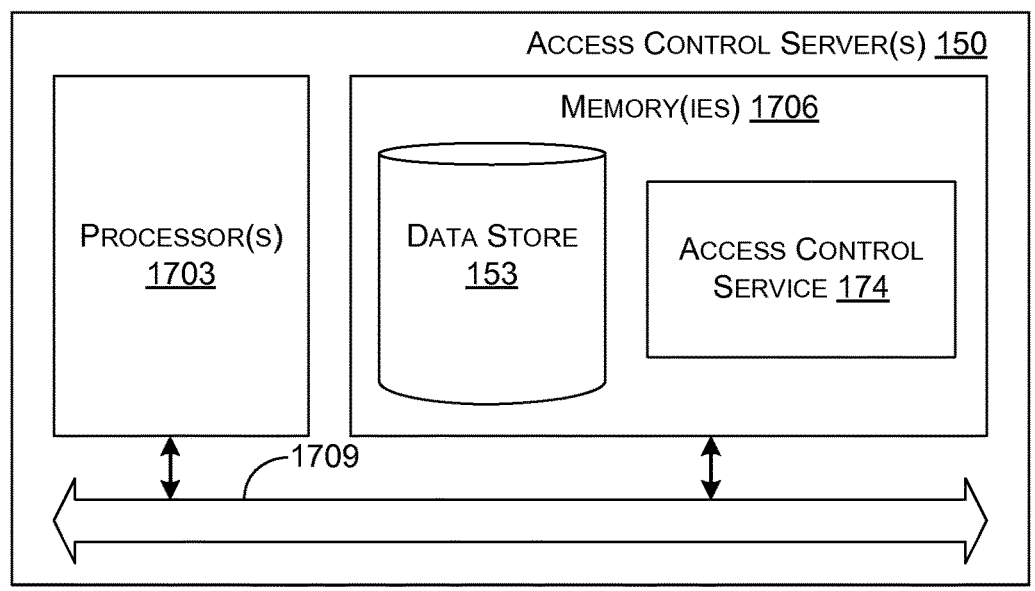
FIG. 17 illustrates schematic block diagrams of an access control server and a client device employed in the network environments of FIGS. 1, 12 and 14 according to certain embodiments of the disclosure.
Figure 17:
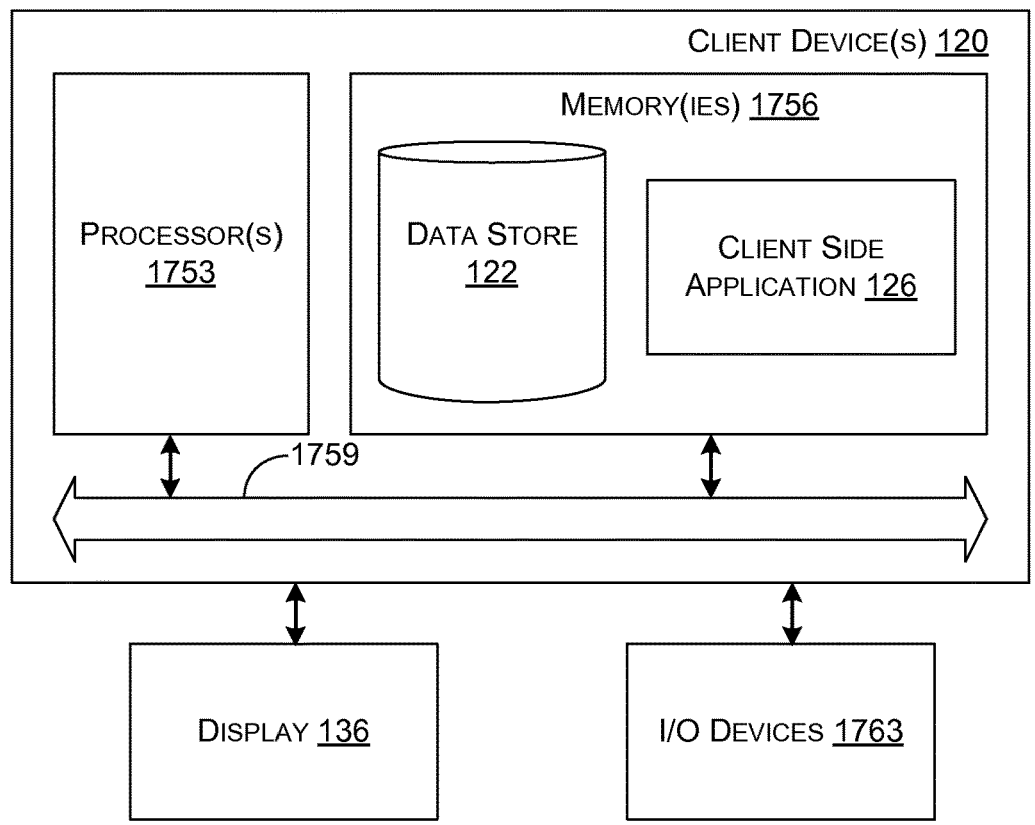

FIG. 17 shows schematic block diagrams of an exemplary access control server 150 and an exemplary client device 120 according to an embodiment of the present disclosure. The access control server 150 includes at least one processor circuit, for example, having a processor 1703 and memories 1706, both of which are coupled to a local interface 1709. To this end, the access control server 150 may comprise, for example, at least one server computer or like device. Similarly, the client device 120 includes at least one processor circuit, for example, having a processor 1753 and a memory 1756, both of which are coupled to a local interface 1759. Additionally, the client device 120 may be in data communication with a display 136 for rendering user interfaces 137 (FIG. 1) and at least one other input/output (I/O) devices 1763 for inputting and outputting data. To this end, the client device 120 may comprise, for example, at least one client computer or like device.

The following is a general discussion of the components of the access control server 150 and the client device 120. The local interface 1709 and 1759 may comprise, for example, a data bus with an accompanying address/control bus or other bus structure as can be appreciated. Stored in the memories 1706 and 1756 are both data and several components that are executable by the processors 1703 and 1753. In particular, with regard to the access control server 150, stored in the memories 1706 and executable by the processor 1703 are an access control service 174 and potentially other applications. Additionally, with regard to the client device 120, stored in the memories 1756 and executable by the processor 1753 are a client side application 126 and potentially other applications. Also stored in the memories 1706 and 1756 may be data stores 153 and 122 and other data. In addition, an operating system may be stored in the memories 1706 and 1756 and executable by the processors 1703 and 1753.

It is to be understood that there may be other applications that are stored in the memories 1706 and 1756 and are executable by the processors 1703 and 1753 as can be appreciated. Where any component discussed herein is implemented in the form of software, any one of a number of programming languages may be employed such as, for example, C, C++, C #, Objective C, Java, JavaScript, Perl, PHP, Visual Basic, Python, Ruby, Delphi, Flash, or other programming languages.

A number of software components are stored in the memories 1706 and 1756 and are executable by the processors 1703 and 1753. In this respect, the term "executable" means a program file that is in a form that can ultimately be run by the processors 1703 and 1753. Examples of executable programs may be, for example, a compiled program that can be translated into machine code in a format that can be loaded into a random access portion of the memories 1706 and 1756 and run by the processors 1703 and 1753, source code that may be expressed in proper format such as object code that is capable of being loaded into a random access portion of the memories 1706 and 1756 and executed by the processors 1703 and 1753, or source code that may be interpreted by another executable program to generate instructions in a random access portion of the memories 1706 and 1756 to be executed by the processors 1703 and 1753, etc. An executable program may be stored in any portion or component of the memories 1706 and 1756 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 1706 and 1756 are defined herein as including both volatile and nonvolatile memory and data storage components. Volatile components are those that do not retain data values upon loss of power. Nonvolatile components are those that retain data upon a loss of power. Thus, the memories 1706 and 1756 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM)

and other such devices. The ROM may comprise, for example, a programmable read-only memory (PROM), an erasable programmable read-only memory (EPROM), an electrically erasable programmable read-only memory (EEPROM), or other like memory device.

Also, the processors 1703 and 1753 may represent multiple processors, and the memories 1706 and 1756 may represent multiple memories that operate in parallel processing circuits, respectively. In such a case, the local interface 1709 and 1759 may be an appropriate network 110 (FIG. 1) that facilitates communication between any two of the multiple processors 1703 and 1753, or between any two of the memories 1706 and 1756, etc. The local interface 1709 and 1759 may comprise additional systems designed to coordinate this communication, including, for example, performing load balancing. The processors 1703 and 1753 may be of electrical or of some other available construction.

Although the access control service 174, client side application 126, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of at least one data signal, an application specific integrated circuit that has appropriate logic gates, or another component, etc. Such technologies are generally well known by those skilled in the art and, consequently, are not described in detail herein.

The flowcharts of FIGS. 2, 3, 13, 15 and 16 show certain functionality and operations performed by the access control service 174 and client side application 126, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processors 1703 and 1753 in a computer system or other system. The machine code may be converted from the source code, etc. If embodied in hardware, each block may represent a circuit or a number of interconnected circuits to implement the specified logical function(s).

Although the flowcharts of FIGS. 2, 3, 13, 15 and 16 show a specific order of execution, it is understood that the order of execution may differ from that which is depicted. For example, the order of execution of two or more steps may be scrambled relative to the order shown. Also, two or more blocks shown in succession in FIGS. 2, 3, 13, 15, and 16 may be executed concurrently or with partial concurrence. Further, in some embodiments, at least one of the steps shown in FIGS. 2, 3, 13, 15 and 16 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the access control service 174 and the client side application 126, that comprises software or code can be embodied in any non-transitory computer-readable medium for use by or in connection with an instruction execution system such as, for example, processors 1703 and 1753 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device to ensure security of e-mail attachments, comprising code that:

receives a resource rule that specifies a secure container application authorized to access e-mail attachments;

receives an e-mail including an attachment using an e-mail program, the attachment having been modified by a management system based on an administrator policy to restrict access to the attachment to the secure container application;

displays the e-mail in the e-mail program;

receives a selection of the attachment using the e-mail program; and automatically launches the secure container application specified in the resource rule to open the attachment.

2. The non-transitory computer-readable medium of claim 1, further comprising code that, when executed:

prohibits access to the attachment by encrypting the attachment; and restricts access to the attachment by any other third-party application by providing a decryption key to only the secure container application.

3. The non-transitory computer-readable medium of claim 1, further comprising code that, when executed:

determines a device type from which the e-mail will be accessed; and restricts access to the attachment to access by the secure container application in an instance in which the device type is a smartphone.

4. The non-transitory computer-readable medium of claim 1, further comprising code that, when executed:
receives an authorization indication from the management system specifying restrictions on accessing the attachment.

5. The non-transitory computer-readable medium of claim 1, further comprising code that, when executed:
transmits the attachment from the e-mail program to the secure container application upon receiving the selection of the attachment.

6. The non-transitory computer-readable medium of claim 1, further comprising code that, when executed:
determines whether a user is authorized to access the particular attachment prior to automatically launching the secure container application to open the attachment.

7. The non-transitory computer-readable medium of claim 1, further comprising code that, when executed:
evaluates a device profile of a device executing the email program to determine whether the device is authorized to access the particular attachment.

8. A method to ensure security of e-mail attachments, comprising:
receiving a resource rule that specifies a secure container application authorized to access e-mail attachments;
receiving an e-mail including an attachment using an e-mail program, the attachment having been modified by a management system based on an administrator policy to restrict access to the attachment to the secure container application;
displaying the e-mail in the e-mail program;
receiving a selection of the attachment using the e-mail program; and
automatically launching the secure container application specified in the resource rule to open the attachment.

9. The method of claim 8, further comprising:
prohibiting access to the attachment by encrypting the attachment; and
restricting access to the attachment by any other third-party application by providing a decryption key to only the secure container application.

10. The method of claim 8, further comprising:
determining a device type from which the e-mail will be accessed; and
restricting access to the attachment to access by the secure container application when the device type is a mobile tablet.

11. The method of claim 8, further comprising:
receiving an authorization indication from the management system specifying restrictions on accessing the attachment.

12. The method of claim 8, further comprising:
transmitting the attachment to the secure container application upon receiving the selection of the attachment.

13. The method of claim 8, further comprising:
determining whether a user is authorized to access the particular attachment.

14. The method of claim 8, further comprising:
evaluating a device profile of a device executing the email program to determine whether the device is authorized to access the particular attachment.

15. A mobile device comprising software to ensure security of e-mail attachments, comprising:
a processor; and
a memory, the processor and the memory configured to:
receive a resource rule that specifies a secure container application authorized to access e-mail attachments;
receive an e-mail including an attachment using an e-mail program, the attachment having been modified by a management system based on an administrator policy to restrict access to the attachment to the secure container application;
display the e-mail in the e-mail program;
receive a selection of the attachment using the e-mail program; and
automatically launch the secure container application specified in the resource rule to open the attachment.

16. The system of claim 15, wherein the processor and the memory are further configured to:
prohibit access to the attachment by encrypting the attachment; and
restrict access to the attachment by any other third-party application by providing a decryption key to only the secure container application.

17. The system of claim 15, wherein the processor and the memory are further configured to:
determine a device type from which the e-mail will be accessed; and
restrict access to the attachment to access by the secure container application in an instance in which the device type is a smartphone.

18. The system of claim 15, wherein the processor and the memory are further configured to:
receive an authorization indication from the management system specifying restrictions on accessing the attachment.

19. The system of claim 15, wherein the processor and the memory are further configured to:
transmit the attachment to the secure container application upon receiving the selection of the attachment.

20. The system of claim 15, wherein the processor and the memory are further configured to:
determine whether a user is authorized to access the particular attachment; and
evaluate a device profile of a device executing the email program to determine whether the device is authorized to access the particular attachment.

* * * * *